(12) United States Patent
Antur et al.

(10) Patent No.: US 6,212,558 B1
(45) Date of Patent: *Apr. 3, 2001

(54) METHOD AND APPARATUS FOR CONFIGURING AND MANAGING FIREWALLS AND SECURITY DEVICES

(76) Inventors: Anand K. Antur, 1552 Woodmeadow Ct., San Jose, CA (US) 95131; Sanjay Sawhney, 3445 Homestead Ave., #34, Santa Clara, CA (US) 95051; Hemant Puri, 996 Henderson Ave. #4, Sunnyvale, CA (US) 94086; Naveen S. Bisht, 724 Duncanville Ct., Campbell, CA (US) 95008

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,100

(22) Filed: Dec. 24, 1997

Related U.S. Application Data

(60) Provisional application No. 60/044,853, filed on Apr. 25, 1997.

(51) Int. Cl.[7] ...................................... G06F 15/16
(52) U.S. Cl. ................... 709/221; 709/203; 709/217; 709/219; 709/223; 709/227; 709/228; 709/229; 709/249; 709/218; 709/220; 709/225; 713/201
(58) Field of Search ..................... 709/203, 217–219, 709/221, 223, 227–229, 249, 299; 713/201

(56) References Cited

U.S. PATENT DOCUMENTS 5,577,209 * 11/1996 Boyle et al. .................... 395/200.06

* cited by examiner

Primary Examiner—John A. Follansbee
(74) Attorney, Agent, or Firm—Townsend and Townsend and Crew LLP

(57) ABSTRACT

A method for configuring a plurality of network security devices, includes the steps of providing a network directory services server providing network directory services to a plurality of network servers, each of the plurality of network servers coupled to one of the plurality of network security devices, implementing a security policy for the plurality of network security devices on the network directory services server, and using the network directory services to provide configuration information for the plurality of network security devices, in response to the security policy.

20 Claims, 28 Drawing Sheets

Fig. 9

METHOD AND APPARATUS FOR CONFIGURING AND MANAGING FIREWALLS AND SECURITY DEVICES

This application is a continuation-in-part of and claims the benefit of U.S. Provisional Application No. 60/044,853, filed Apr. 25, 1997, the disclosure of which is incorporated by reference.

BACKGROUND OF THE INVENTION

The present invention relates to configuring and managing network security devices. More specifically, the present invention relates to configuring of network firewalls and security devices at single administration points. Further the present invention relates to management of multi-platform firewalls using services such as VPN, Authentication Servers, etc.

Introduction

With the explosive growth of the Internet, computer users are now able to access many valuable sources of information, and, at the same time, users are now exposed to many new perils. Such perils include downloading of destructive computer viruses to sophisticated third-party, network attacks. In response to dangers lurking from "outside" computer networks, firewalls and other types of security devices have emerged as a preferred type of computer network security system.

As corporations and other organizations connect their networks to the public Internet, the risks of endangering information assets have risen dramatically. Not a day or a week passes without the popular press commenting on the latest episode of Internet-related fraud, information corruption, or other incidents that dramatically underscore the darker side of the communications revolution. Computer and communications security, a topic once the exclusive province of obscure firms catering mainly to the government defense, intelligence agencies, and to financial services companies, have become mainstream almost overnight.

The concern for network security has led to a need for more sophisticated security systems than most organizations have needed until now. At one time, these organizations were content with the security provided by their network operating systems, network directory services, routers, and gateways. However, these rudimentary systems are now no longer sufficient to resist the attacks of legions of determined Internet hackers, or from an organization's own employees.

Generally, a firewall is a security mechanism for controlling access between a private, trusted network and an untrusted outside network (which might be the public Internet or some other part of the corporate network within the intranet). Firewalls typically provide from one to three levels of security: packet filtering, circuit-level gateways, and application-level gateways. Firewalls are not all created alike for they often differ greatly in their architecture, the types platforms they run upon, their security capabilities, and their ability to support mixed protocol networks. For example, the mixed protocol network: TCP/IP is not, contrary to popular belief, the only network protocol still left standing—millions of IPX clients still need to get secure access to the Internet without going through the dreaded "forklift upgrade" to a whole new protocol stack.

Mixed Protocol Networks

Rumors of the death of NetWare as a network platform are exaggerated. Although WindowsNT is gaining market share, there are in excess of three million NetWare servers (and 55 million NetWare clients) currently in use. Thus, mixed networks at both the protocol and operating system platform level will be around for years to come as well as the need to securely and seamlessly access the Internet and its rich information resources.

Current solutions for providing security in mixed protocol networks are quite limited in scope. For example, IP/IPX gateways provide Internet connectivity for IPX clients, but the security is very basic. Application security, for example, is generally based only on TCP ports numbers alone, although some products also support ICMP or UDP port-based filtering. Further, the security focus of these gateway products is typically on controlling outbound access, and not on dealing with the more serious problem of inbound network access. More importantly, these gateways do not appear to provide security for IP clients.

Other mixed protocol network solutions such as filtering bridges or packet-level filtering by routers are partial solutions, and have major security limitations. Further, they typically do not support Internet services for IPX clients. IP firewalls (as long as they provide capabilities up to and including an application level gateway), provide some security for IP clients, but not for IPX clients and servers. Dual-protocol-stack clients can be implemented to get around the IP-only nature of the Internet and of IP firewalls, but this method is complex to implement and manage and is very difficult to administer.

The usefulness of firewalls has been limited, by their inability to work in hybrid network environments that employ multiple protocols and multiple platforms. What is needed are improved firewall configuration and management methods and apparatus for such hybrid network environments.

SUMMARY OF THE INVENTION

The present invention discloses methods and apparatus for configuring and managing firewalls.

According to one embodiment, a method for configuring a plurality of network security devices, includes the steps of providing a network directory services server providing network directory services to a plurality of network servers, each of the plurality of network servers coupled to one of the plurality of network security devices, and implementing a security policy for the plurality of network security devices on the network directory services server. The step of using the network directory services to provide configuration information for the plurality of network security devices, in response to the security policy is also disclosed.

According to another embodiment, a network of trusted network servers including a computer system for configuring security features in the network of trusted network servers is described, the computer system including a processor and a computer readable media. The computer readable media including software code that directs the processor to provide directory services to the network of trusted network servers and software code that directs the processor to receive security feature configuration data for the network of trusted network servers from a remote client. The computer readable media also includes software code that directs the processor to use the directory services to provide each of the network of trusted network servers with the security feature configuration data.

Further understanding of the nature and advantages of the invention may be realized by reference to the remaining portions of the specification, drawings, and attached documents

BRIEF DESCRIPTION OF THE DRAWINGS

FIGS. 7–24 illustrate configuration modification user interfaces according to an embodiment of the present invention.

DESCRIPTION OF SPECIFIC EMBODIMENTS

Firewall Primer

Figure 1:
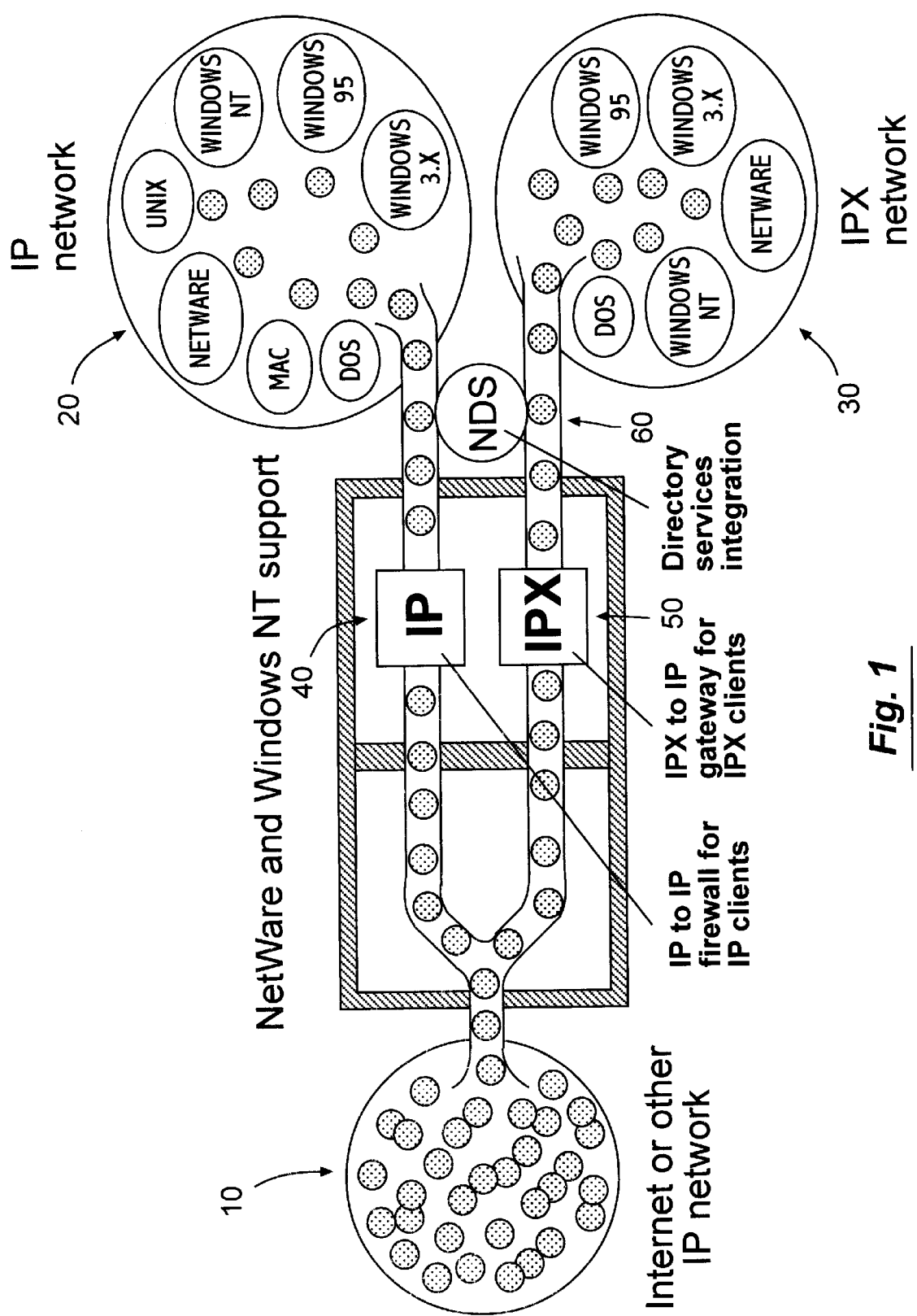
FIG. 1 illustrates a typical embodiment of the present invention.

This following section defines some essential security terms and explains some key concepts essential to understanding the different architectural approaches to building firewalls.

Definitions

Firewall: A type of security mechanism for controlling access between a private trusted network and an untrusted outside network (which might be the public Internet or some other part of the corporate network within an intranet). It typically includes software running on general purpose or specialized hardware.

Protocol gateway: A protocol translation mechanism for connecting (for example) an IPX network to an IP network, for example a public network to private network. The term 'gateway' is also sometimes used to refer to circuit-level and application-level firewalls but these are not protocol gateways.

LDAP: Lightweight Directory Access Protocol, a proposed directory protocol standard.

DS: Directory Services are global, distributed information databases that provide access to network resources, regardless of physical location. Such directory services are preferably Novell Directory Services, Microsoft's Active Directory Services, LDAP and other directory services provide central points of administration for entire networks of networks. DS typically maintain information about every resource on the network, including users, groups, printers, volumes, and other devices. This information is typically stored on a single logical database, thus, instead of logging onto many individual file servers, users and network administrators log onto the network preferably only once.

Network address translation (NAT): With the growing shortage of IP addresses, it has become increasingly difficult for organizations to obtain all the registered IP addresses they need. A network address translator solves this problem by dynamically converting between a re-usable pool of dynamically assigned registered IP addresses and the internal IP addresses used in an organization's intranet. This not only alleviates the IP address crunch, but it also eliminates the need to renumber when an organization changes Internet service providers (ISPs).

Transparent proxy: A transparent proxy provides the user with the ability to use an application process running on a firewall without explicitly requiring the client to specify that proxy. In other words, the client perceives that it is still speaking to the router gateway. This feature typically makes it considerably easier to install a firewall without having to reconfigure every client in a TCP/IP environment.

The major types of networks in terms of their security classification are as follows:

Trusted network: Users on this network are, by default, deemed to be trustworthy. Users may be physically on a common network, or linked together via a virtual private network (VPN).

DMZ: The 'Demilitarized Zone' lies outside the perimeter defenses provided by the firewall but contains systems that are owned by a private organization. Common examples would be Web servers and anonymous ftp servers providing information to Internet users.

Untrusted network: These are outside networks of various kinds, among the many thousands of networks connected to the Internet, or even untrusted networks that may be part of other departments or divisions within an organization.

Types of Firewalls

Firewalls typically provide one of three different levels of security—packet filtering, circuit-level gateway, and application gateway—or some combination of these.

Packet filtering firewalls typically provide the most basic form of firewall security and is typically a standard feature of routers. Packet filters inspect the header of each incoming and outgoing packet for user-defined content, such as an IP address or a specific bit pattern, but do not validate or track the state of sessions. These firewalls typically also filter at the application port level—for example, ftp access generally utilizes port 21. However, since any packet with the right IP address can pass through the filter once the port is enabled, there is a security hole for other applications or sessions addressed to the same port. Packet filtering is typically the least secure form of firewall and typically the cheapest.

Circuit-level gateway firewalls validate TCP and, in some products, User Datagram Protocol (UDP) sessions before opening a connection or circuit through the firewall. The state of the session is monitored, and traffic is only allowed while the session is still open. This is more secure than packet filtering but allows any kind of data through the firewall while the session is open, creating a security hole. This is better than packet filtering but still falls short of total security. Further, if this gateway does not support UDP, it cannot support native UDP traffic such as domain name service (DNS) and SNMP.

Application-level gateway firewalls run an application process (sometimes termed a 'proxy') on the firewall for each application that is supported. By understanding the application and the content of the traffic flowing through the firewall, typically a high degree of control can be applied. For example, a given user can have the right to use a certain application, such as ftp, but only for some commands (such as "get") and not for others (such as "put"). In addition, application traffic, down to the level of specific file types, can be controlled, for example by allowing ".doc" files to be transferred through the gateway, but not ".xls" files, which might contain company financial data. These firewalls typically also provide highly detailed logging of traffic and security events. In addition, application-level gateway firewalls can use NAT to mask the real IP address on a node on the internal network and thus make it invisible to the outside.

Stateful inspection firewalls are essentially hybrid firewalls that have elements of all of the above firewalls, but lack the full application layer inspection capabilities of an application level gateway. An example of such a firewall is a traffic inspection engine is based on a generalized scripting language. The engine executes inspection rules written in this language. The principal advantage over an application gateway is that it can provide greater simplicity in terms of adding firewall support for new applications, however it typically lacks security robustness.

Typically, the most secure form of firewall, as illustrated by the preferred embodiment of the present invention, is a 'multi-level firewall'—one which combines the capabilities of a packet filter, a circuit level gateway and an application level gateway to provide in-depth defense. Security attacks can come at any level. For example, some kinds of attacks are best prevented at the application level (such as an illegal file write operation to a corporate server using FTP while others are best prevented at the packet level (such as IP spoofing)—the combination of multiple levels of security is stronger than any one of them used alone.

To provide enhanced security and support for multi-protocol networks, for example, with IP and IPX clients, the present application describes a new category of firewall—one that integrates both a multi-level IP firewall and an IPX/IP gateway.

Security Policy

Firewalls and other types of security devices provide means of enforcing security policies that define acceptable uses of applications and acceptable access to information—both inbound and outbound. Since all network communications between a trusted network and all other types of network must pass through the firewall in a well-designed network, the firewall is uniquely well positioned to play the role of network traffic "cop".

The user organization's access policy on the inbound side might define acceptable access to specific servers or other host by time of day, by type of application, or by type of file, and the like. On the outbound side, the policy might also prevent users from accessing specific Web sites, specific pages within a Web site, and the like. A source of a communication, a destination, and a specific application are typically included in a security policy. Inbound or outbound communications that fall out side of the parameters of the policy are considered security violations, and a multi-level firewall can and should be configured to detect and prevent them.

However sophisticated the hard ware and software that provides a network's security perimeter, network security is typically only as good as the organization's security policy and the users who implement it—including end users and network administrators alike. Since users are the weak link in any security system, ease of use and ease of management are essential to providing a security system that will not be abandoned because it is too hard to use or too expensive to manage.

Further information regarding firewalls can be found in the following references: Repelling the Wily Hacker, Bill Cheswick and Steve Bellovin, Addison-Wesley, 1994; Building Internet Firewalls, D. Brent Chapman and Elizabeth Zwicky, O'Reilly & Associates, 1995; Web Server Technology, Nancy Yeager and Robert McGrath, Morgan Kaufman Publishers, 1996, hereinby incorporated by reference for all purposes.

System Overview

FIG. 1 illustrates a typical embodiment of the present invention. FIG. 1 includes a plurality of untrusted networks 10 (such as an IP network), a trusted IP based network 20, a trusted IPX based network 30, an IP to IP based firewall server 40, an IP to IPX based firewall server 50, and a directory services (DS) server 60.

As illustrated in FIG. 1, access from trusted network such as trusted IP network 20 or trusted IPX network 30 to untrusted networks 10 are preferably enabled by firewall server 40 or 50. As shown, when access is required from trusted IP network 20, an IP client to IP server based firewall server 40 is typically required. Further, when access is required from trusted IPX network 20, an IPX client to IP server based firewall server 50 is required.

In one embodiment, directory services (DS) server 60 is provided to enable trusted IP network 20 to communicate with trusted IPX network 30, and vice versa. Preferably, such communication includes accessing of directory structures, files, and the like.

Figure 2:
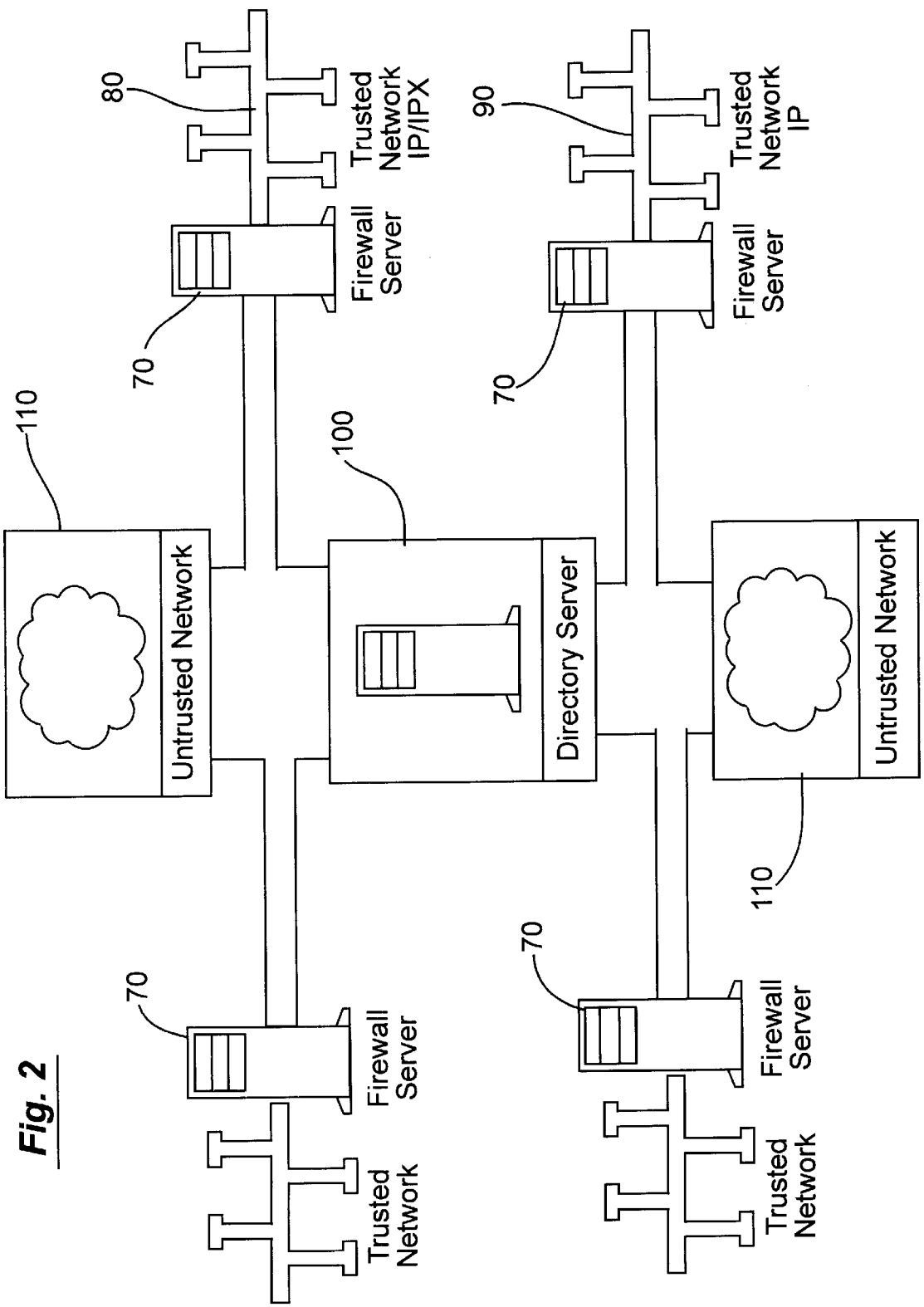
FIG. 2 illustrates a more detailed embodiment of the present invention.

FIG. 2 illustrates a more detailed embodiment of the present invention. FIG. 2 includes a number of firewall servers 70, each preferably coupled to at least one respective trusted network. The trusted networks include IPX based networks 80, and IP based networks 90. A directory services (DS) server 100, and a plurality of untrusted networks 110 are also illustrated.

As shown in FIG. 2, the trusted networks, including IPX based network 80 and IP based network 90 preferably communicate with untrusted networks 110 and each other through respective firewall servers 70. Typical firewall servers are based upon servers having operating systems such as WindowsNT from Microsoft Corporation, NetWare or Intranet Ware from Novell Corporation, proprietary hardware boxes, and the like. Other types of platforms, such as UNIX, and others are used in alternative embodiments of the present invention.

The embodiment illustrated in FIG. 2 represents a network of trusted networks representative of a typical configuration. As shown in detail in FIG. 2, DS server 100 is preferably coupled to the trusted networks by, among other possible configurations, DS server 100. DS server 100 typically embodies directory access services such as Novell Directory Services, LDAP, X.500, ADS, and others. Further information regarding Novell Directory Services (NDS) can be found in documents at the following web site www.novell.com/products/nds/wpnds.html. The documents are incorporated by reference for all purposes.

DS server 100 enables the management of firewall servers 70 from a central administration point. Thus, from the central administration point the user can configure or reconfigure each firewall server to have separate security characteristics, or configure or reconfigure groups of firewall servers to have the same security characteristics. Further the user can use DS server 100 to provide back-up or redundant configuration information, which may be used if the configuration information stored within a local firewall server 70 is compromised or requires updating.

By providing a single point of administration for multiple firewalls, a coherent and uniform security policy can be implemented. Further, by providing this capability, changes in the security policy can be made in a timely fashion. As opposed to logging into each firewall server and modifying the security policy individually, the user logs into one machine, typically DS Server 100 to modify the security policies.

Figure 3:
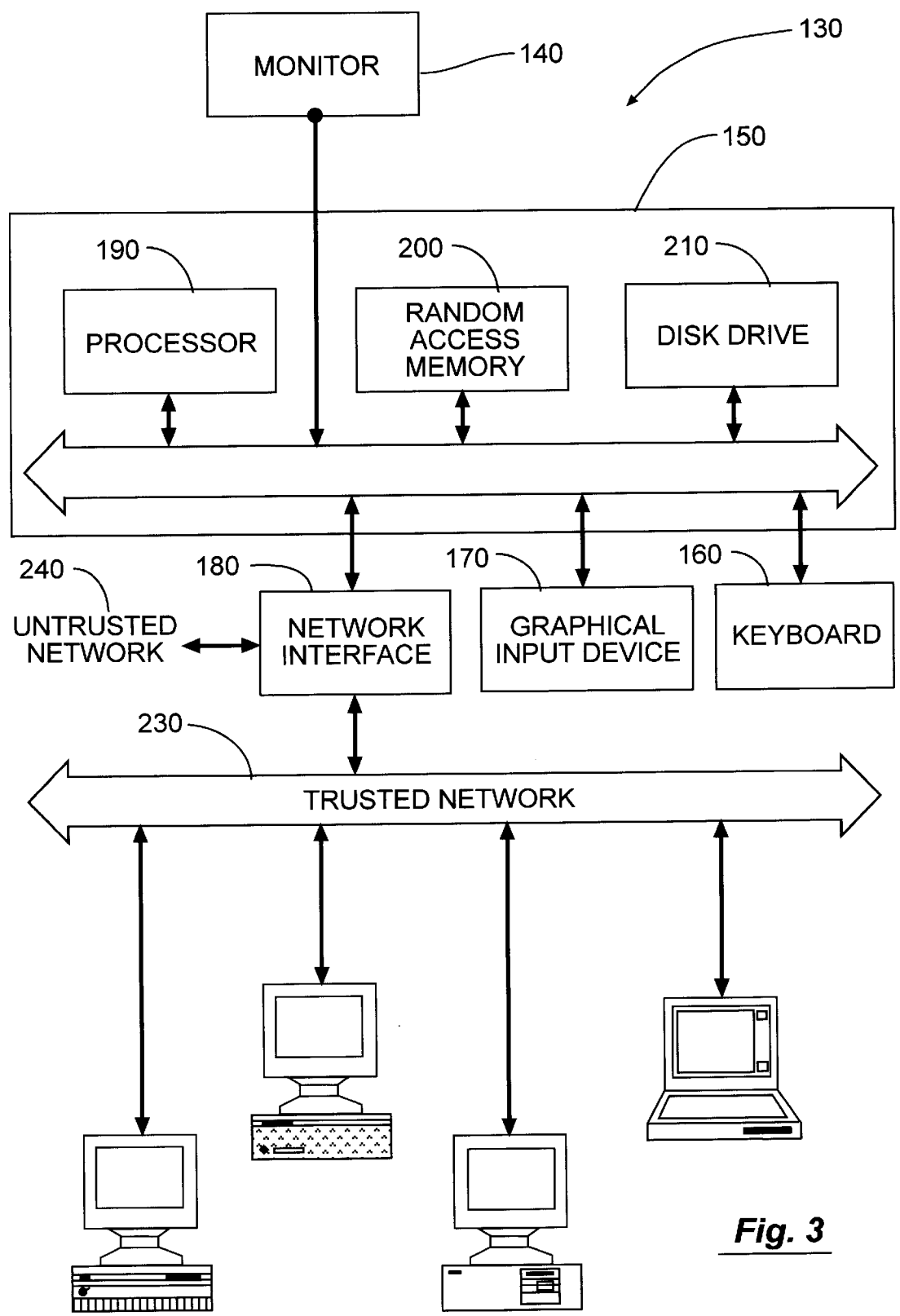
FIG. 3 is a block diagram of a system 130 for firewall servers according to an embodiment of the present invention.

FIG. 3 is a block diagram of a system 130 for firewall servers according to an embodiment of the present invention. System 130 typically includes a monitor 140, a computer 150, a keyboard 160, a graphical input device 170, for example, a mouse, and a network interface unit 180. Computer 150 includes familiar computer components such as a processor 190, and memory storage devices, such as a random access memory (RAM) 200, a disk drive 210, and a system bus 220 interconnecting the above components. Coupled to system 130 are a trusted network 230 and an untrusted network 240.

RAM 200 and disk drive 210 are examples of tangible media for storage of messages, computer programs, configuration files, including embodiments of the present invention, etc. Other types of tangible media include floppy disks, removable hard disks, optical storage media such as CD-ROMS and bar codes, semiconductor memories such as flash memories, read-only-memories (ROMS), ASICs, and battery-backed volatile memories, and the like. Network interface units 180 may be any conventional interface means such as a modem; a network card from 3Com Corporation, Bay Networks, and the like; a hardware or a software router, such as Novell's Net Ware MultiProtocol Router, and the like.

In the preferred embodiment, there are at least two network interface units 180, one "externally" coupled to untrusted network 240 and one coupled to trusted network 230. The addition of additional network interface units may be used to couple system 130 to other trusted networks.

In an embodiment, System 130 includes a 586 microprocessor-class based computer, running on Novel NetWare 4.X Operating system or WindowsNT 4.0 for workstations network software and FireWALL software available from Ukiah Software, Inc. FireWall software is typically user configurable by the use of configuration software that implements a user's firewall security policy.

It should be understood that coupling of system 130 to trusted network 230 need not be a direct connection. It is envisioned that trusted network 230 may be coupled to system 130 by a virtual private network, or similar system, via an untrusted network, such as the Internet.

FIG. 3 is representative of but one type of system for embodying the present invention. It will be readily apparent to one of ordinary skill in the art that many system types and configurations are suitable for use in conjunction with the preferred embodiment of the present invention.

Figure 4A:
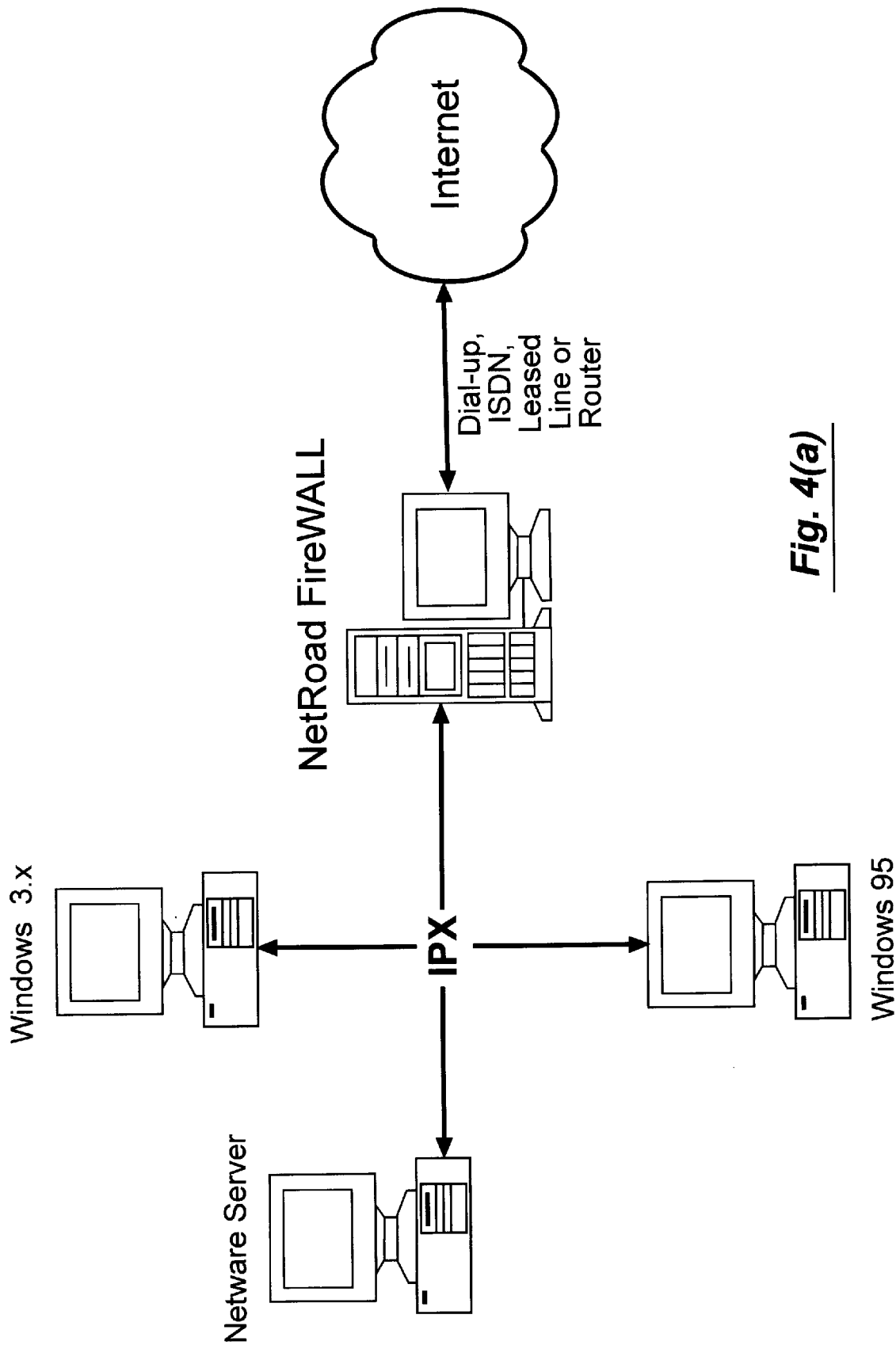
FIGS. 4a–c illustrate typical firewall system configurations for embodiments of the present invention.
Figure 4B:
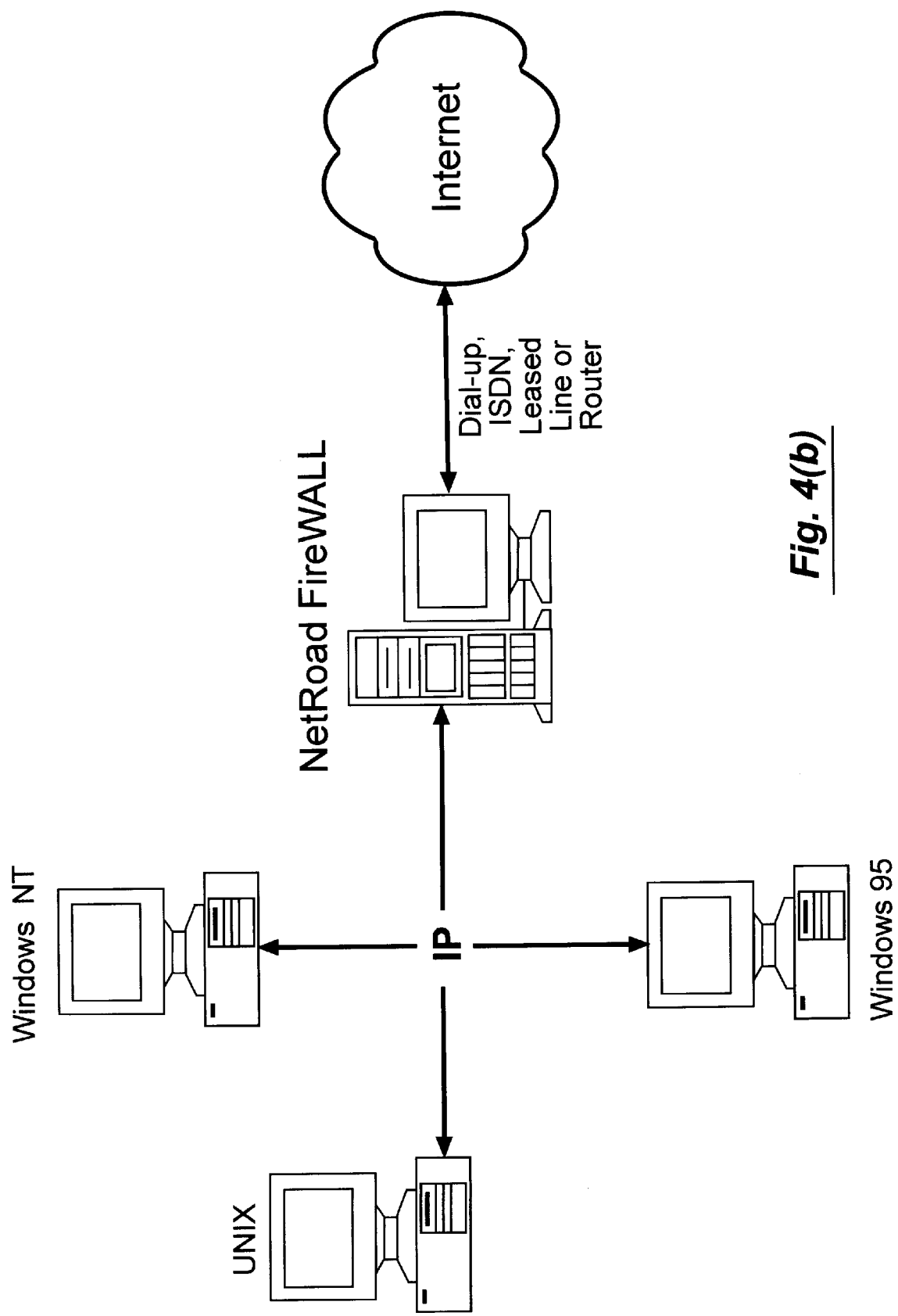
Figure 4C:
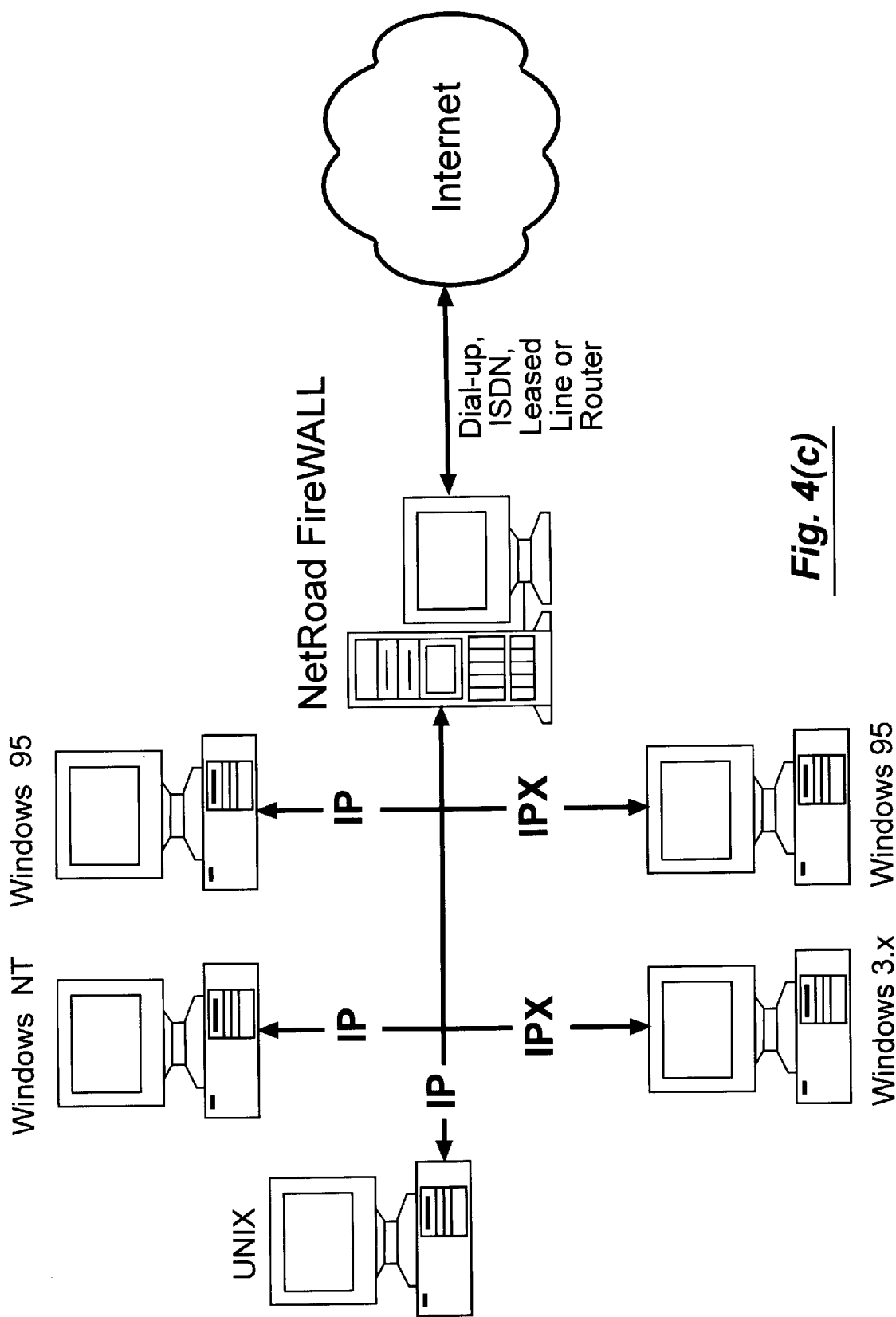

FIGS. 4a–c illustrate typical firewall system configurations for embodiments of the present invention. FIG. 4a illustrates the system configured for a pure IPX network; FIG. 4b illustrates the system configured for a pure IP network; and FIG. 4c illustrates the system configured for a mixed IP/IPX network. FIG. 4a includes a network server 260 and a firewall server 270; FIG. 4b includes a firewall server 290; and FIG. 4c includes a firewall server 310.

In the embodiment in FIG. 4a, network server 260 operates in a pure IPX network and is typically based upon Novell NetWare Server software, In this configuration, firewall server 270 independently provides the firewall and security services and also preferably provides IPX/IP gateway services to the Internet.

In one embodiment of the present invention, firewall server 270 and network server 260 are implemented on physically distinct computer systems. Alternatively, firewall server 270 and network server 260 are implemented upon the same physical computer system, and Netware Server provides the IPX/IP gateway services.

In the embodiment in FIG. 4b, a network server for a pure IP network may be based upon UNIX, WindowsNT or Windows95 servers. In this configuration, firewall server 290 provides the firewall and other security services, but without the IPX/IP gateway services.

In the embodiment in FIG. 4c, a mixed protocol network may be based upon both IPX and IP protocols, as illustrated. In this configuration, firewall server 310 provides the firewall and other security services, and preferably provides the IPX/IP gateway services for IPX transmission packets as needed.

Figure 5:
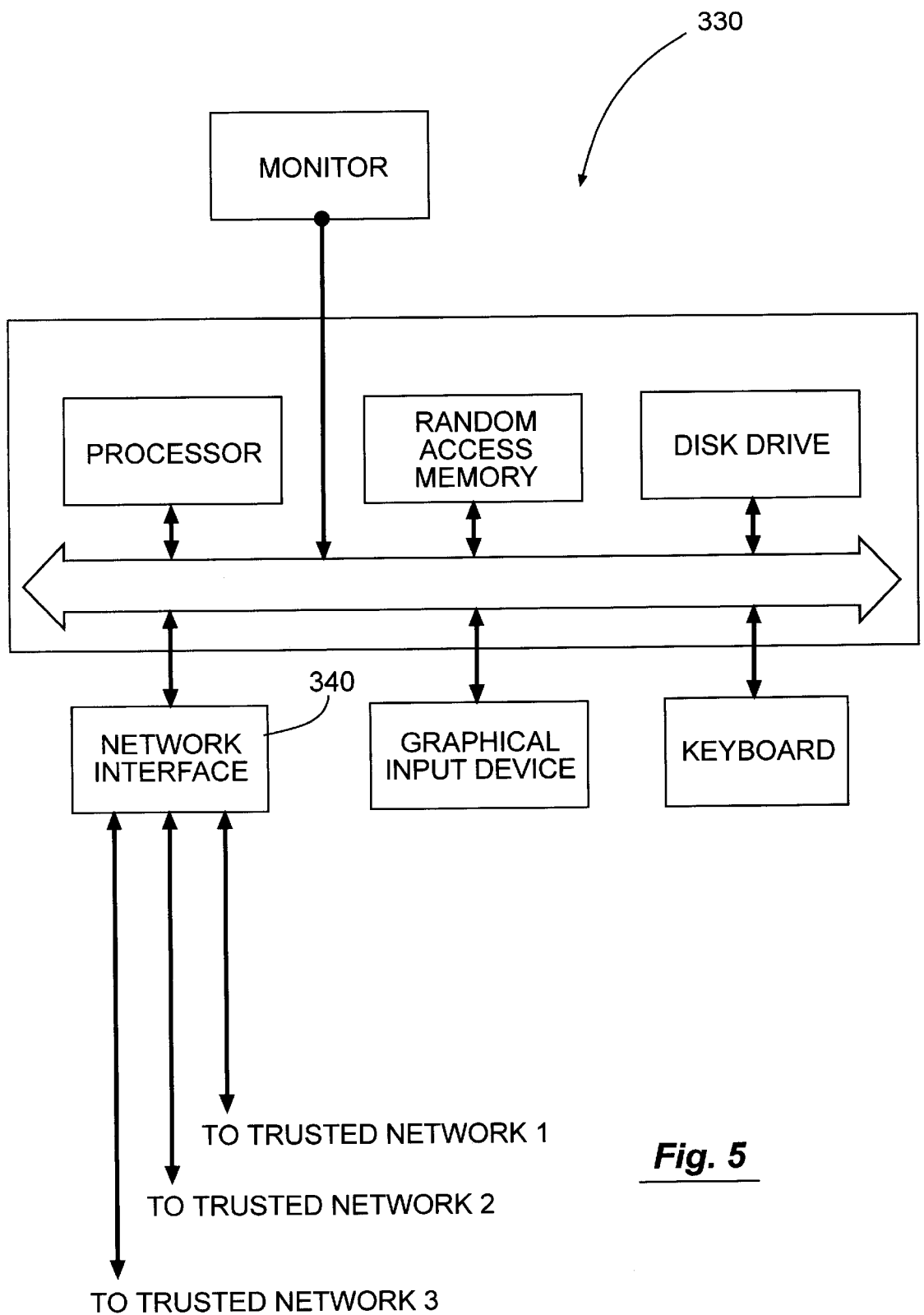
FIG. 5 is a block diagram of a system 330 for a directory services server according to an embodiment of the present invention.

FIG. 5 is a block diagram of a system 330 for a directory services server according to an embodiment of the present invention. System 330 preferably includes many of the same computer hardware and software components described above for FIG. 3.

In FIG. 5, it is preferred that the network interface unit 340 is coupled to internal networks to provide Directory Services between those internal networks. As an example, as illustrated in FIG. 2, DS server 100 is coupled to the trusted networks through firewall servers 70 and can provide directory access from trusted network 80 to trusted network 90 that is transparent to the user.

To provided cross network directory services, it is preferred that each internal network conform with the same directory services protocol. Several of these protocols were mentioned above (Novell Directory Services, LDAP, and the like.) System 340 thus preferably manages directory services requests between internal networks according to the chosen directory services protocol. Further, in one particular embodiment, System 330 preferably manages requests to modify configuration files within firewalls of internal networks.

FIG. 5 is representative of but one type of system for embodying the present invention. It will be readily apparent to one of ordinary skill in the art that many system types and configurations are suitable for use in conjunction with the preferred embodiment of the present invention.

It should be understood that coupling of system 330 to the trusted networks need not be a direct connection. As illustrated in the embodiment in FIG. 2, the coupling is performed via firewall servers 70. Further, it is envisioned that trusted networks may be coupled to system 330 by virtual private networks, or similar system, via a trusted or an untrusted network such as the Internet, or any combination of the above connections, and the like.

In the embodiment illustrated in FIG. 2, DS server 100 provides a central database (a directory services database) that stores configuration information of internal networks such as IPX based networks 80 and IP based networks 90, including in the present embodiment, firewall server 70 configuration information.

Figure 6A:
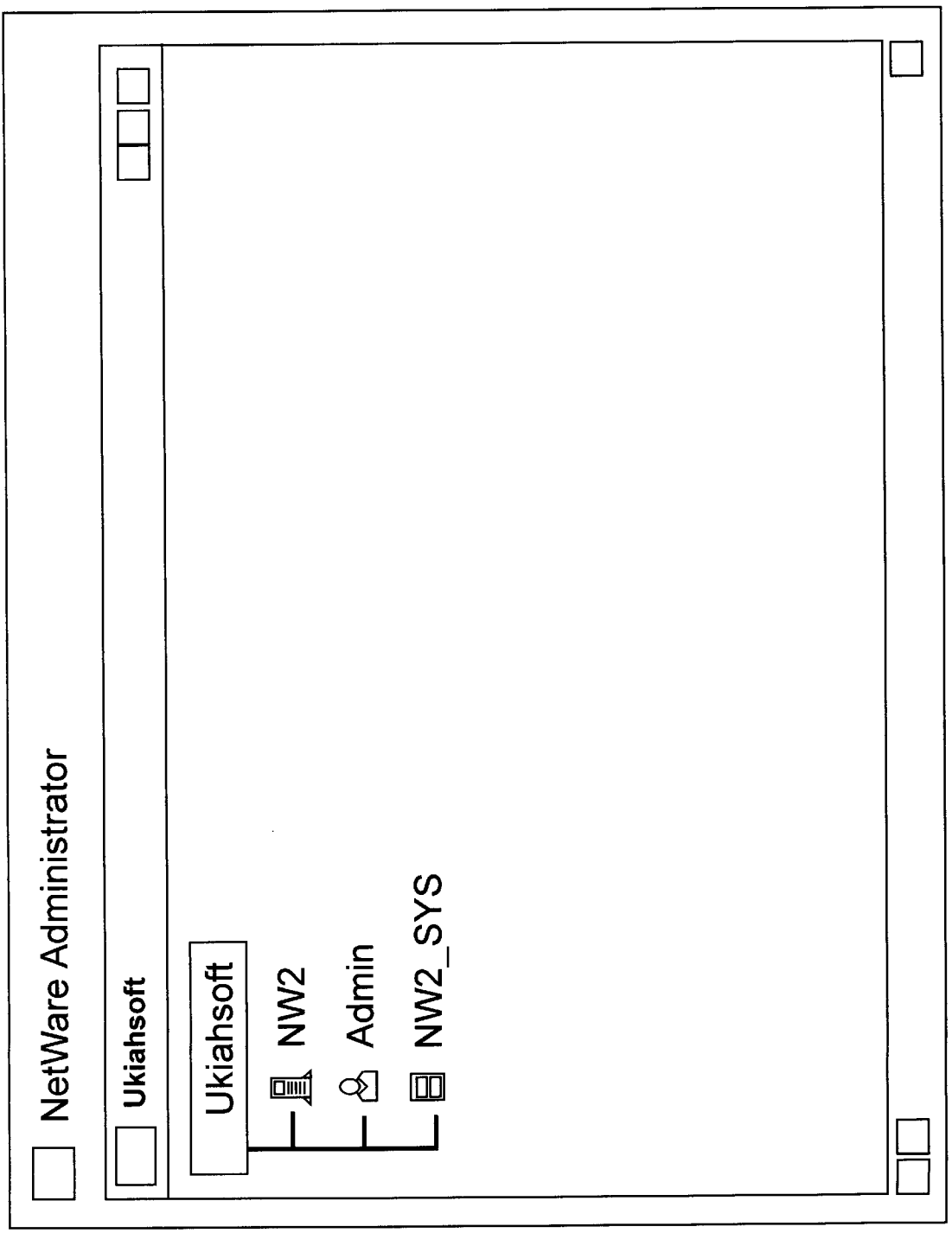
FIGS. 6a–c illustrate installation of firewall configuration information according to an embodiment of the present invention.
Figure 6B:
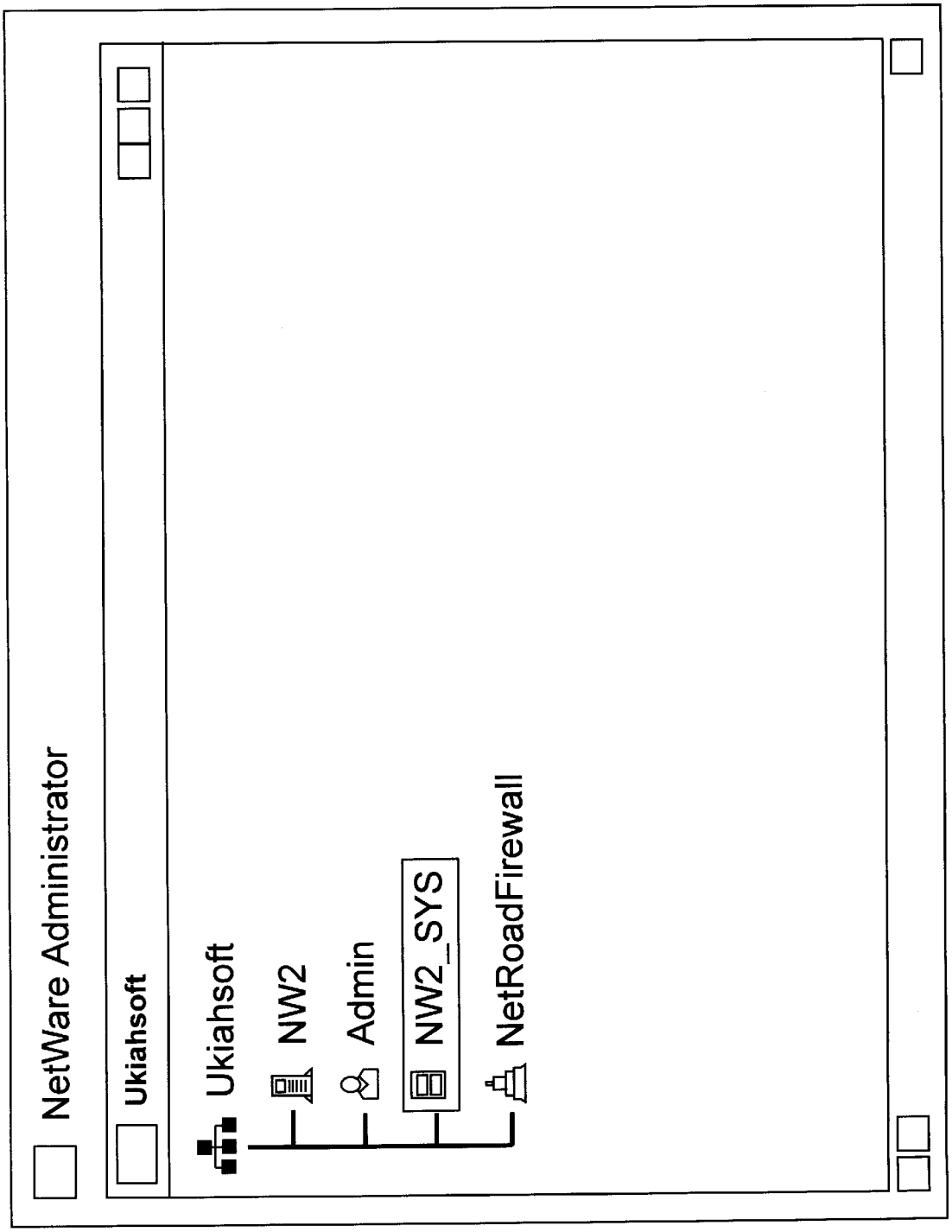
Figure 6C:
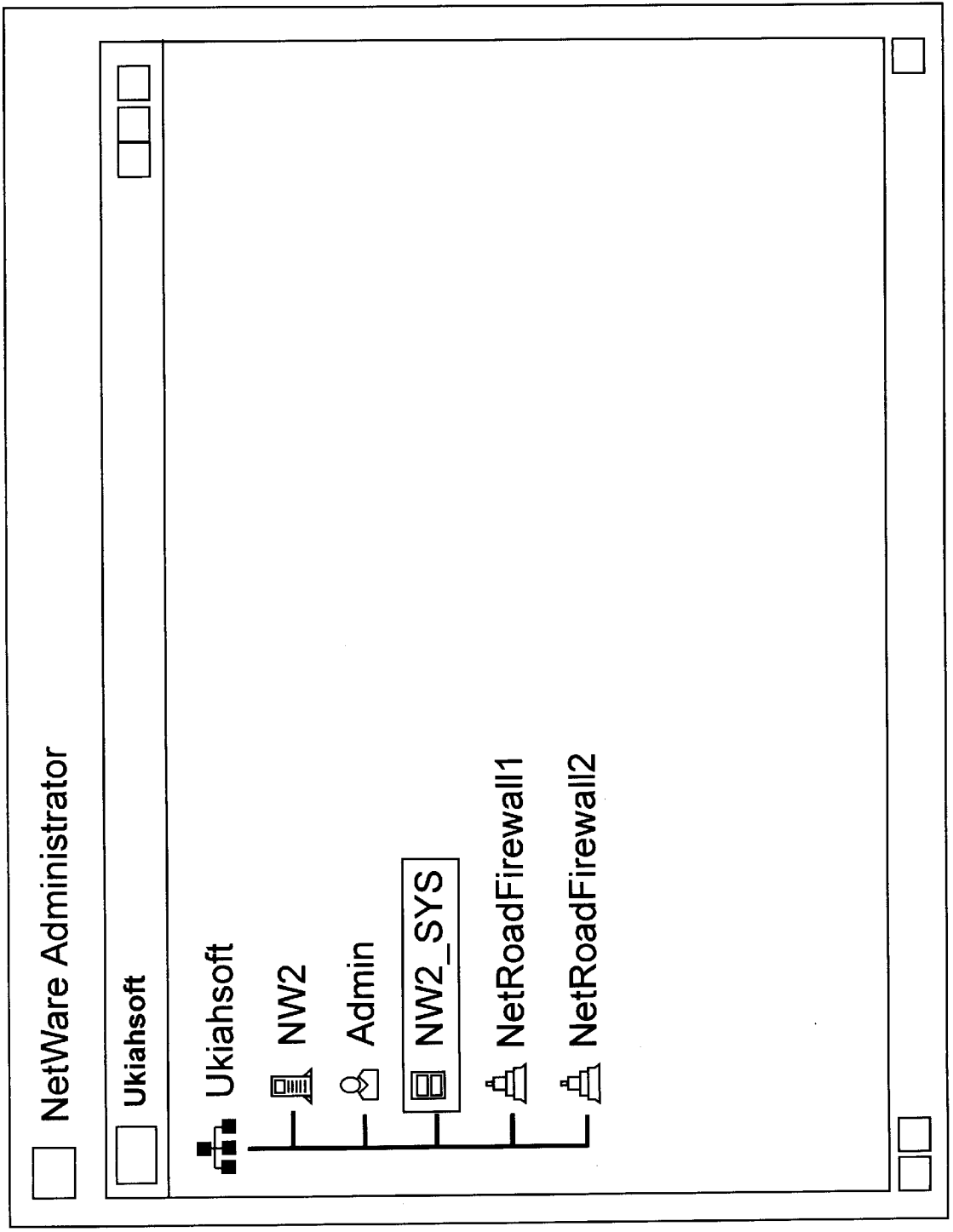

FIGS. 6a–c illustrate installation of firewall configuration information according to an embodiment of the present invention. In particular, FIGS. 6a–c illustrate an embodiment implemented using Novell Directory Services. Other directory services standards or protocols may alternatively be used in other embodiments.

In order to integrate firewall configuration capability to the Novell Directory Services, a configuration administration tool is implemented as a NetWare Administrator software (NWADMIN) "snap-in." The installation of this snap-in extends the Novell Directory Services schema by adding a firewall class and associated attributes. As will be described below, the associated attributes include firewall configuration parameters such as names, groups, access control policies, and the like; and audit log files such as security events, connections, and the like. Password protection and control are thus preferably administered and enforced through the Directory Services administration software.

FIG. 6b illustrates the extension of the Novell Directory Services to include a class of security devices, namely firewall 350. FIG. 6b illustrates the extension of a Directory Services with a single firewall, in a configuration such as illustrated in FIG. 2; FIG. 6c illustrates the extension of a Directory Services with multiple firewalls. Administration of one firewall or multiple firewalls from a single administration point is thus provided with a typical graphical user interface as shown.

FIGS. 7–24 illustrate configuration modification user interfaces according to an embodiment of the present invention. The embodiments shown in FIGS. 7–24, illustrate graphical interfaces presented to the user when the user invokes a network administration client process to modify the configuration of a security device such as a firewall. The client process is preferably invoked at a remote location, i.e. at a location other than the directory services computer console. The configuration options available to the network administration client process are preferably the same as the options available to a user at the directory services computer console.

Figure 7:
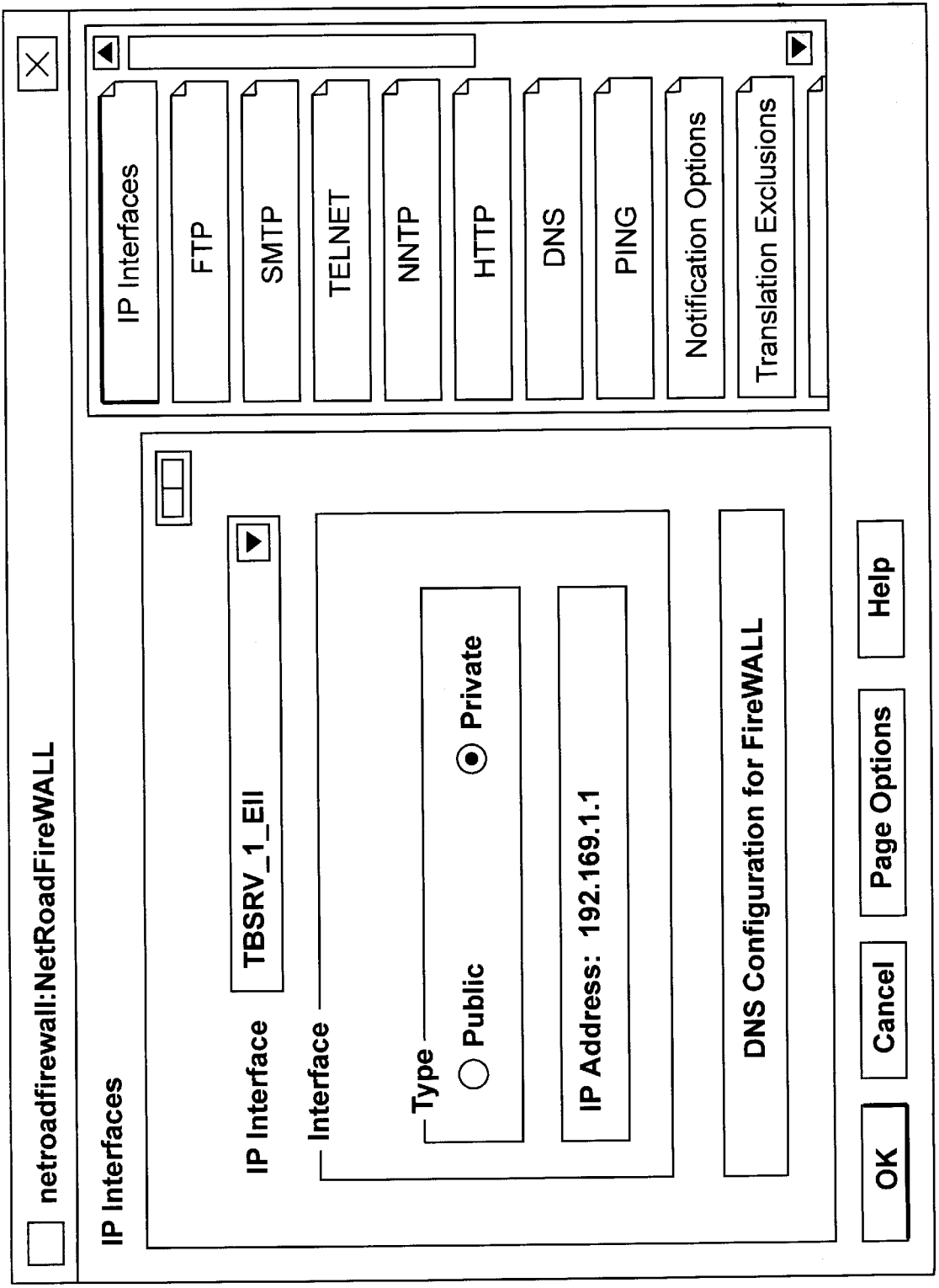

FIG. 7 illustrates that IP Interfaces for a selected firewall can be reconfigured at the network administration client site. In particular, the user can specify whether the IP interface is public or private, can specify the internal DNS information, and the like, as shown.

Figure 8:
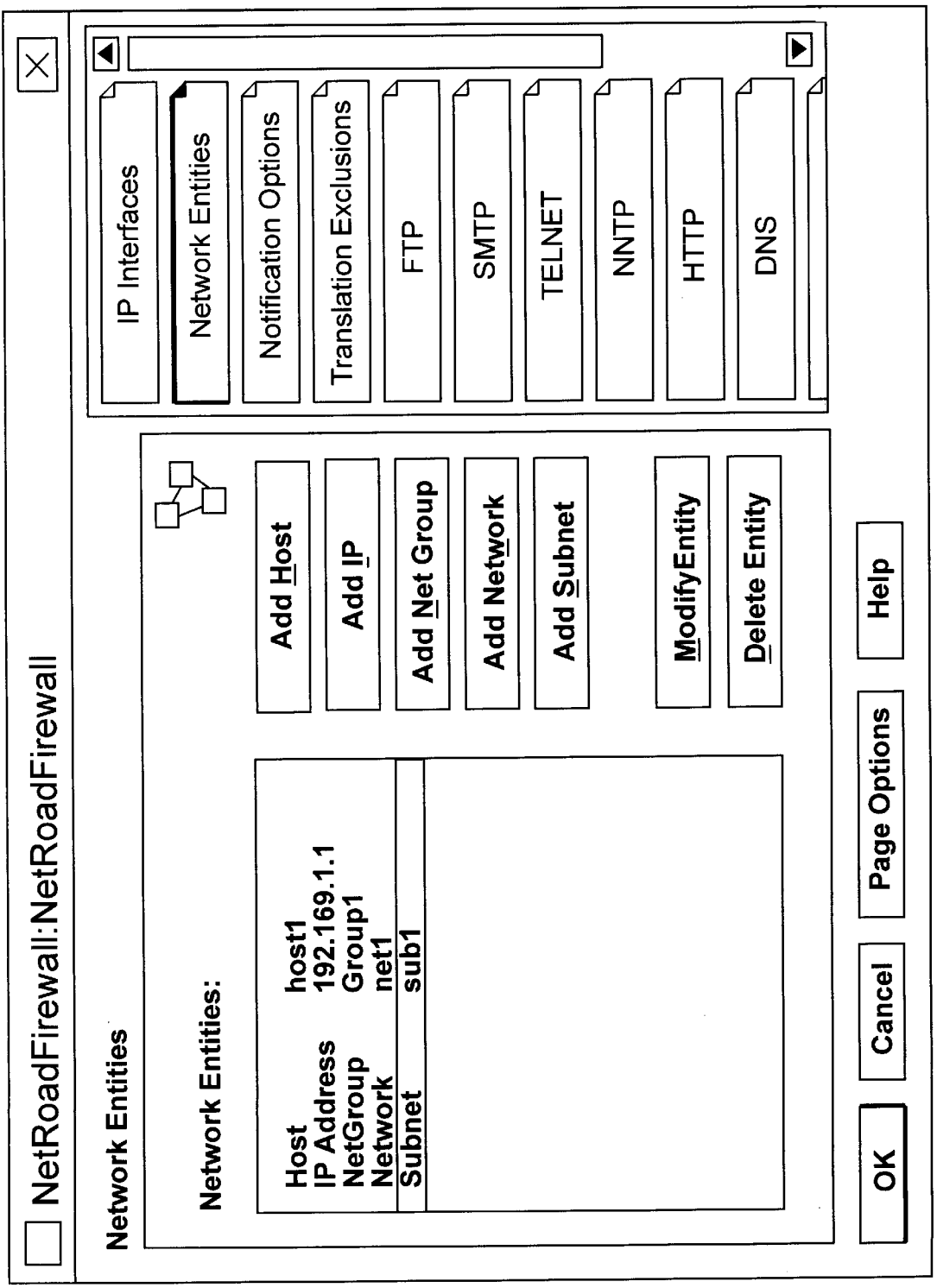

FIG. 8 illustrates that the user can specify and modify network entities definitions from the network administration client site.

Figure 9:
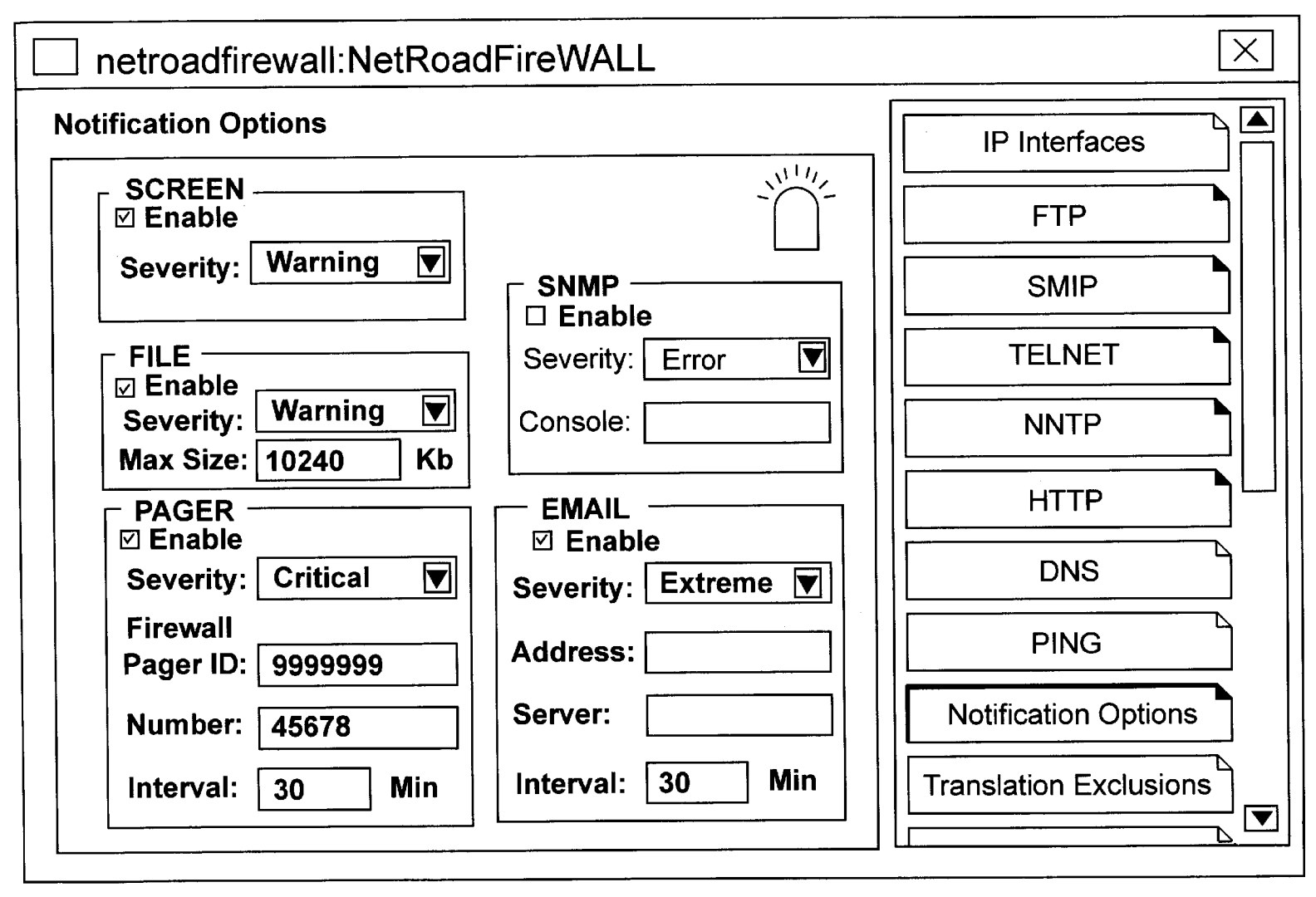

FIG. 9. illustrates that the Notification options graphical user interface allows the user to specify the type of administrator notification, e.g. e-mail warning, page, etc., upon occurrence of specified network events.

Figure 10:
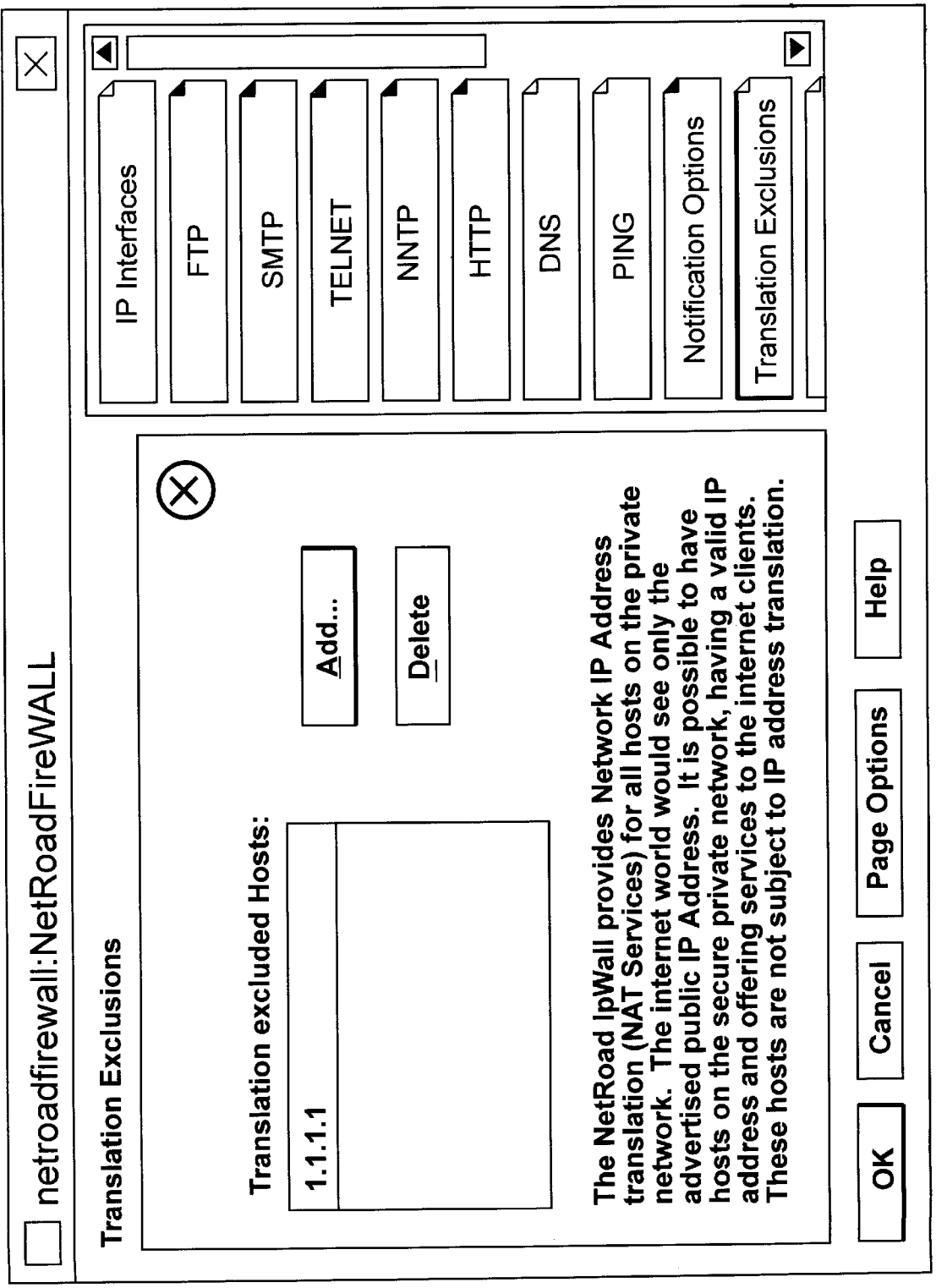

FIG. 10 illustrates that the user can exclude hosts from having translated IP addresses before accessing an untrusted network. In one embodiment the default firewall configuration provides network IP address translation (NAT) until specifically disabled with this user interface.

Figure 11:
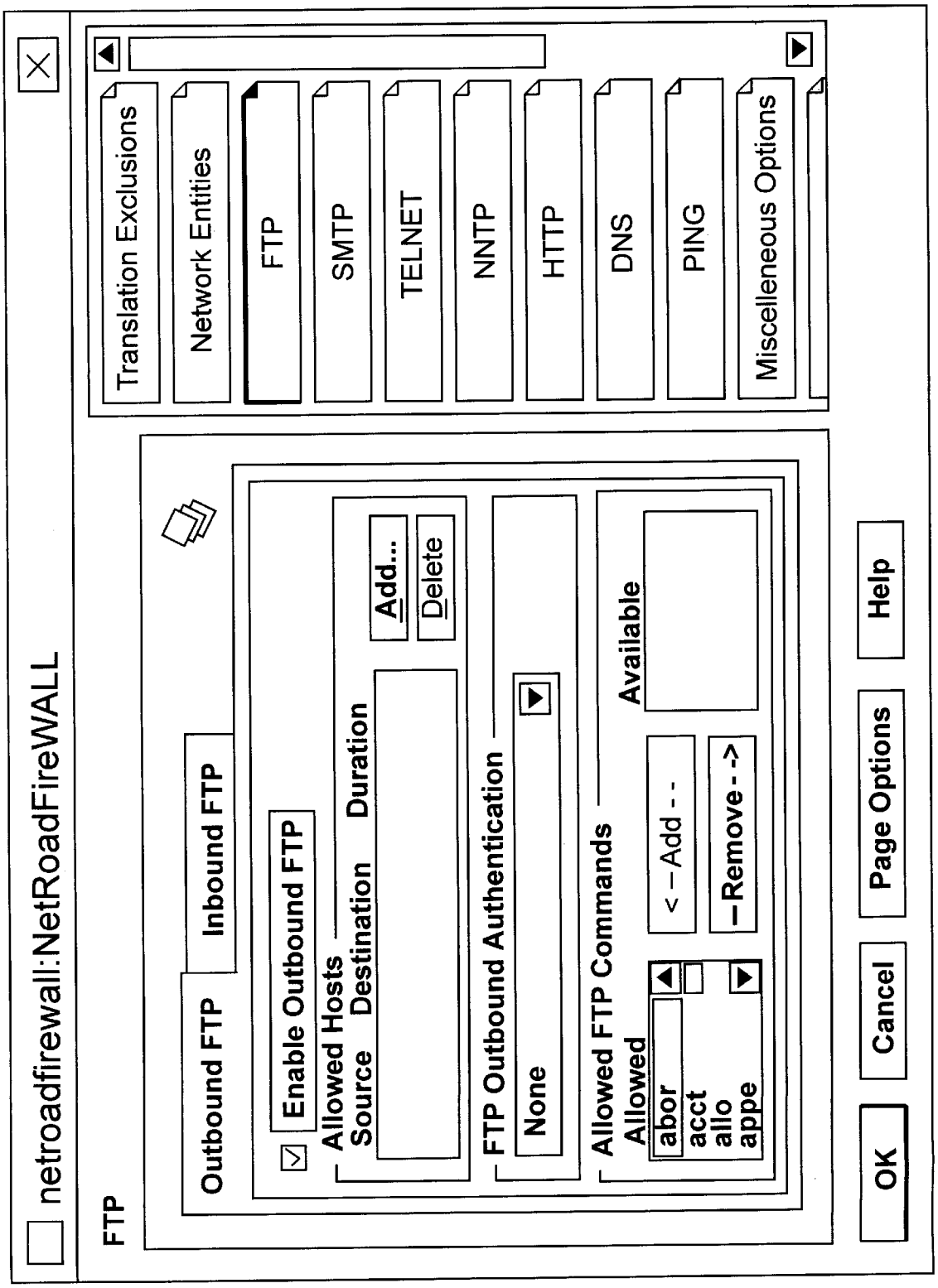

FIG. 11 illustrates that FTP access to and from (inbound and outbound) a particular firewall may be disabled or strictly limited from the network administration client site.

Figure 12:
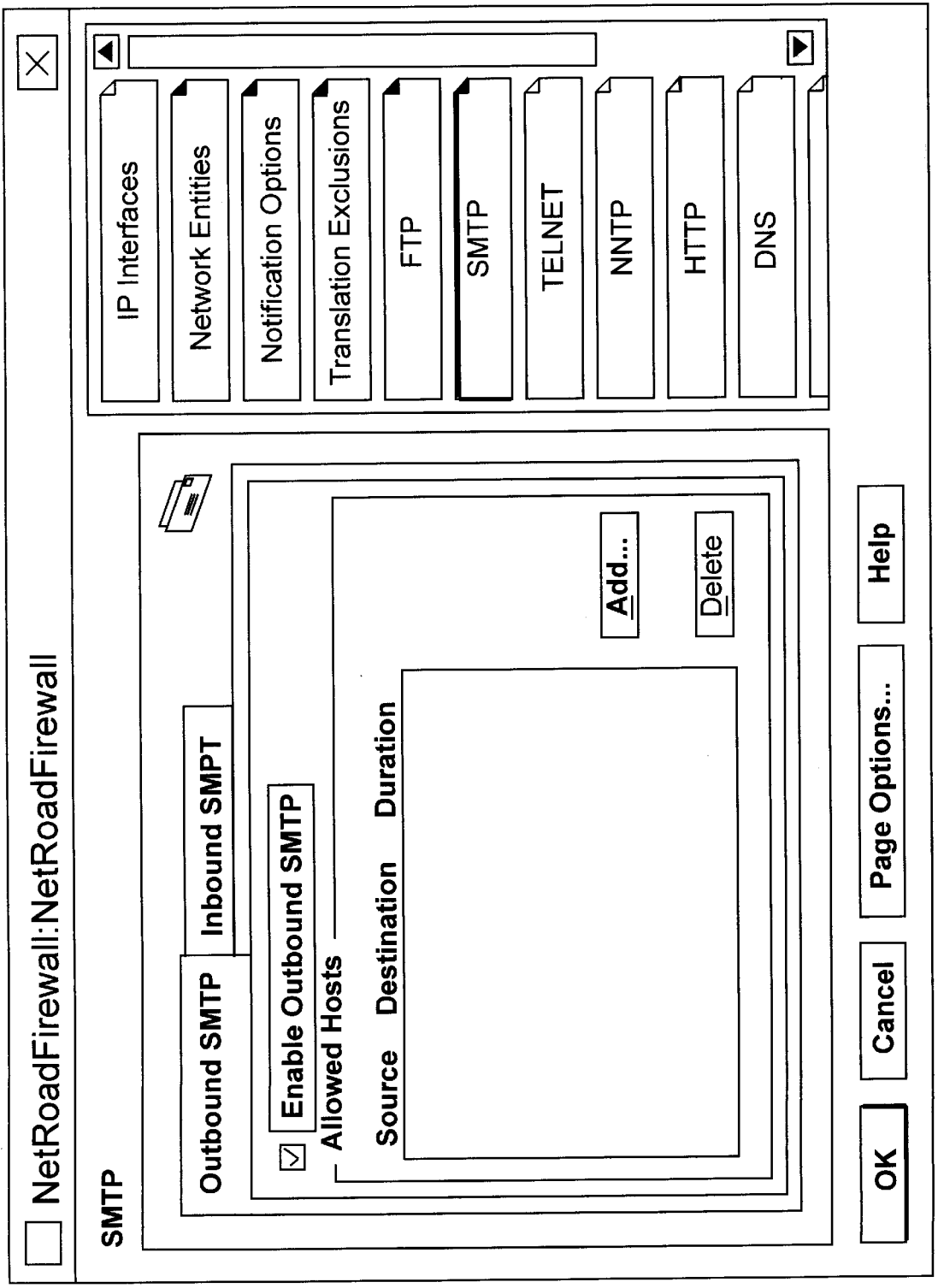

FIG. 12 illustrates that SMTP access to and from (inbound and outbound) a particular firewall may also be disabled or strictly limited from the network administration client site.

Figure 13:
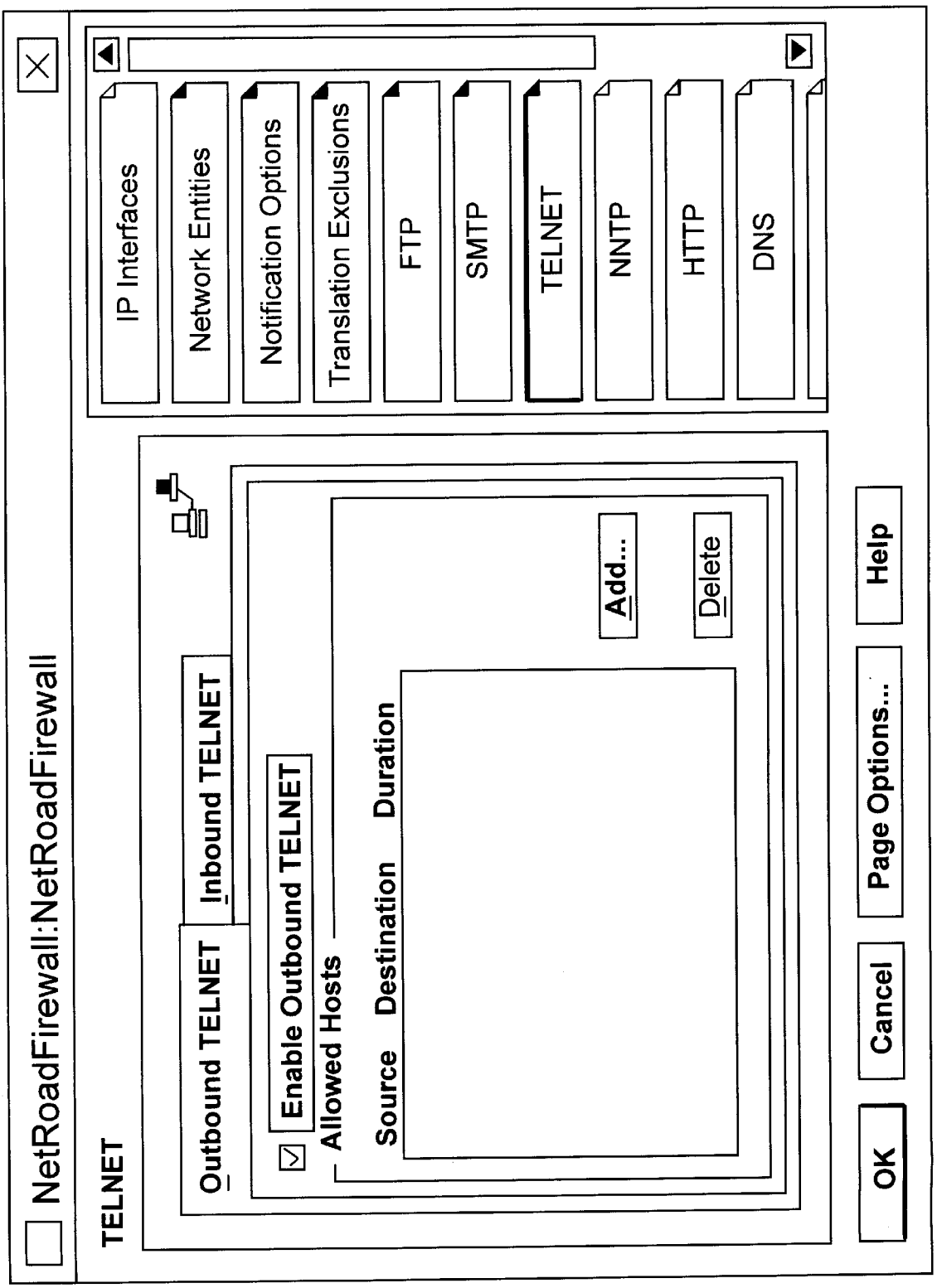

FIG. 13 illustrates that TELNET access to and from (inbound and outbound) a particular firewall may also be disabled or strictly limited from the network administration client site.

Figure 14:
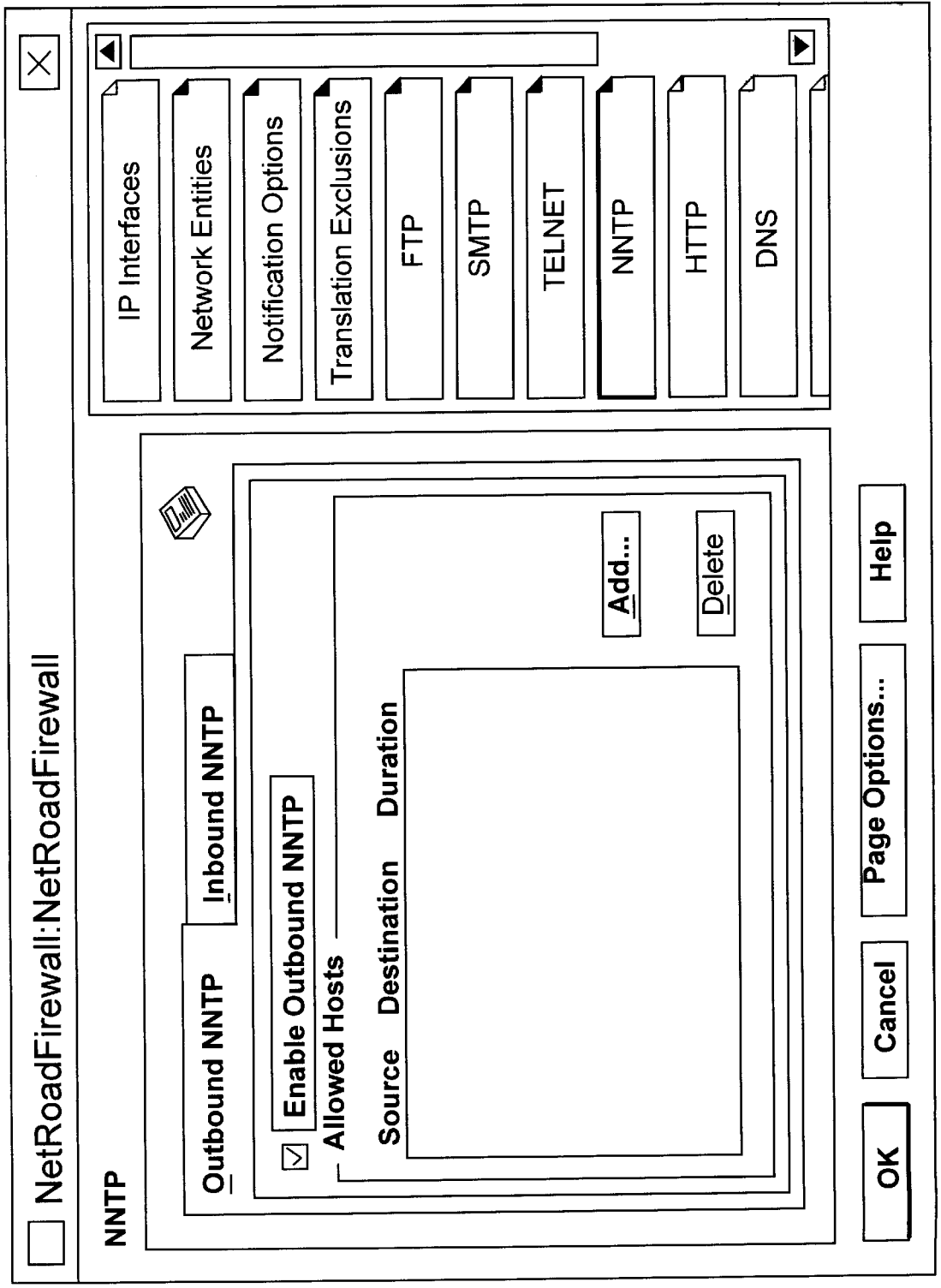

FIG. 14 illustrates that NNTP access to and from (inbound and outbound) a particular firewall may also be disabled or strictly limited from the network administration client site.

Figure 15:
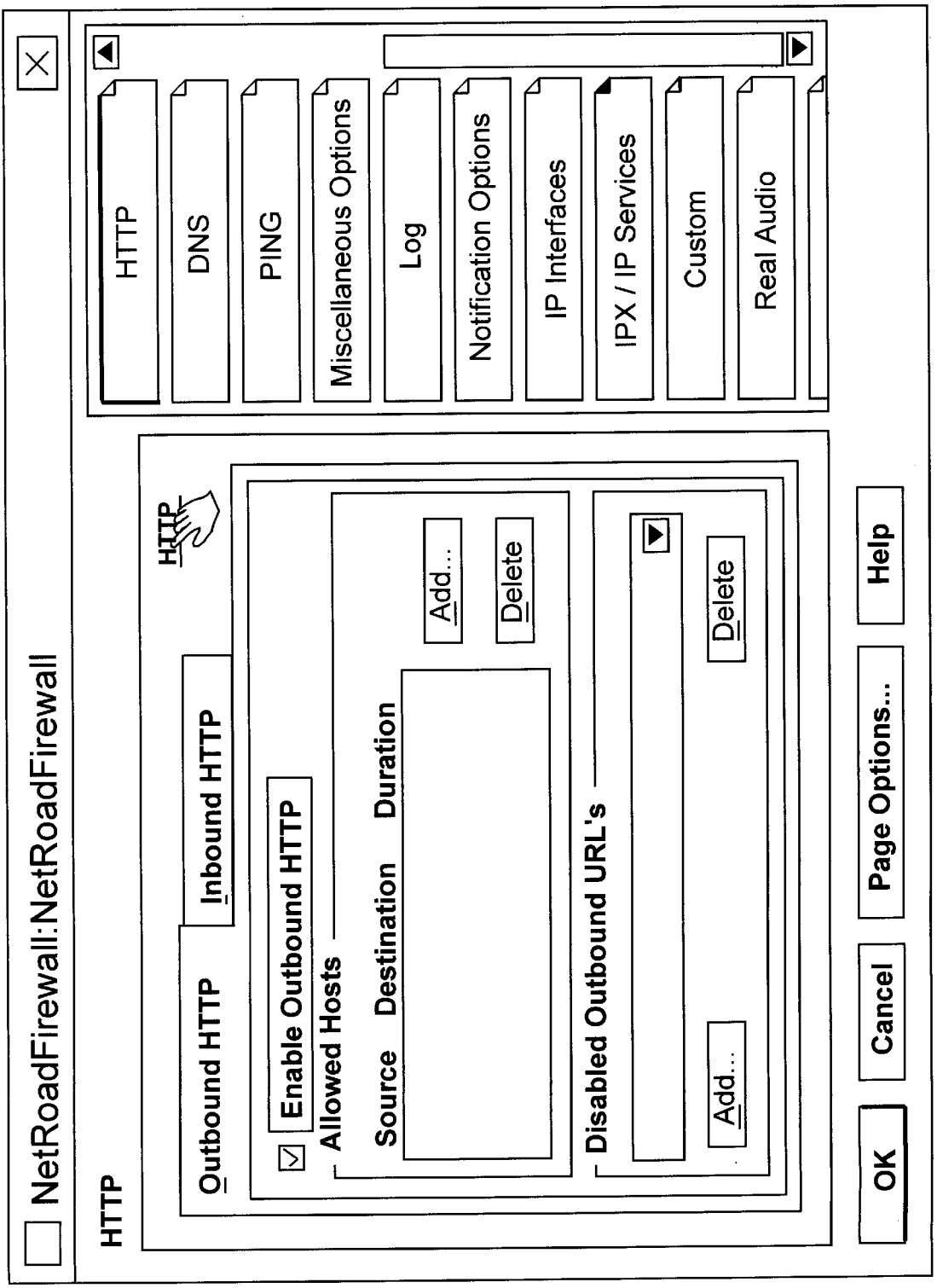

FIG. 15 illustrates that HTTP access to and from (inbound and outbound) a particular firewall may also be disabled or strictly limited from the network administration client site. Outbound access to particular HTTP data is typically limited by specifying the URLs from the Internet sites hosting the HTTP data.

Figure 16:
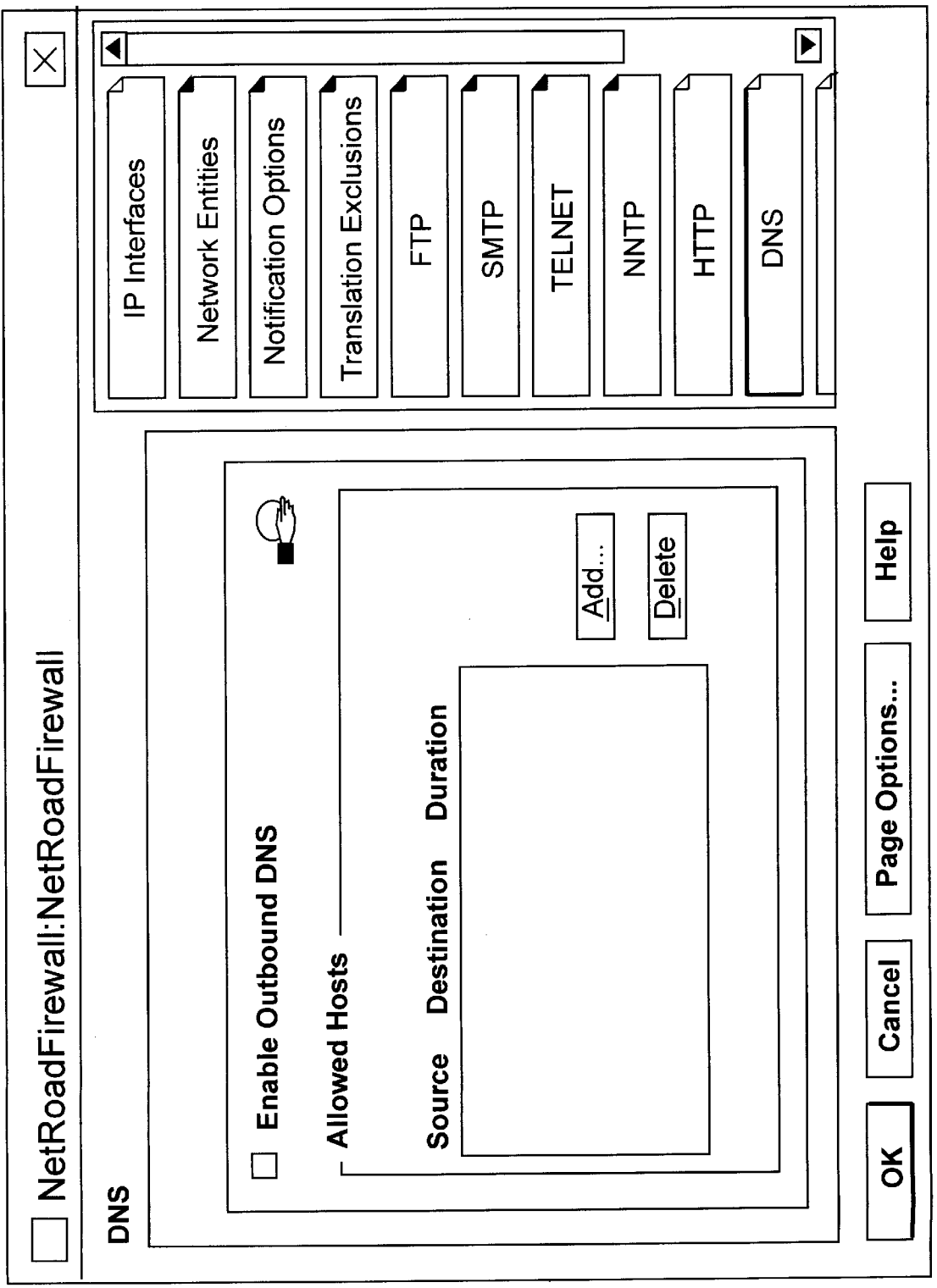

FIG. 16 illustrates that outbound DNS data can be disabled at a particular firewall from the network administration client site.

Figure 17:
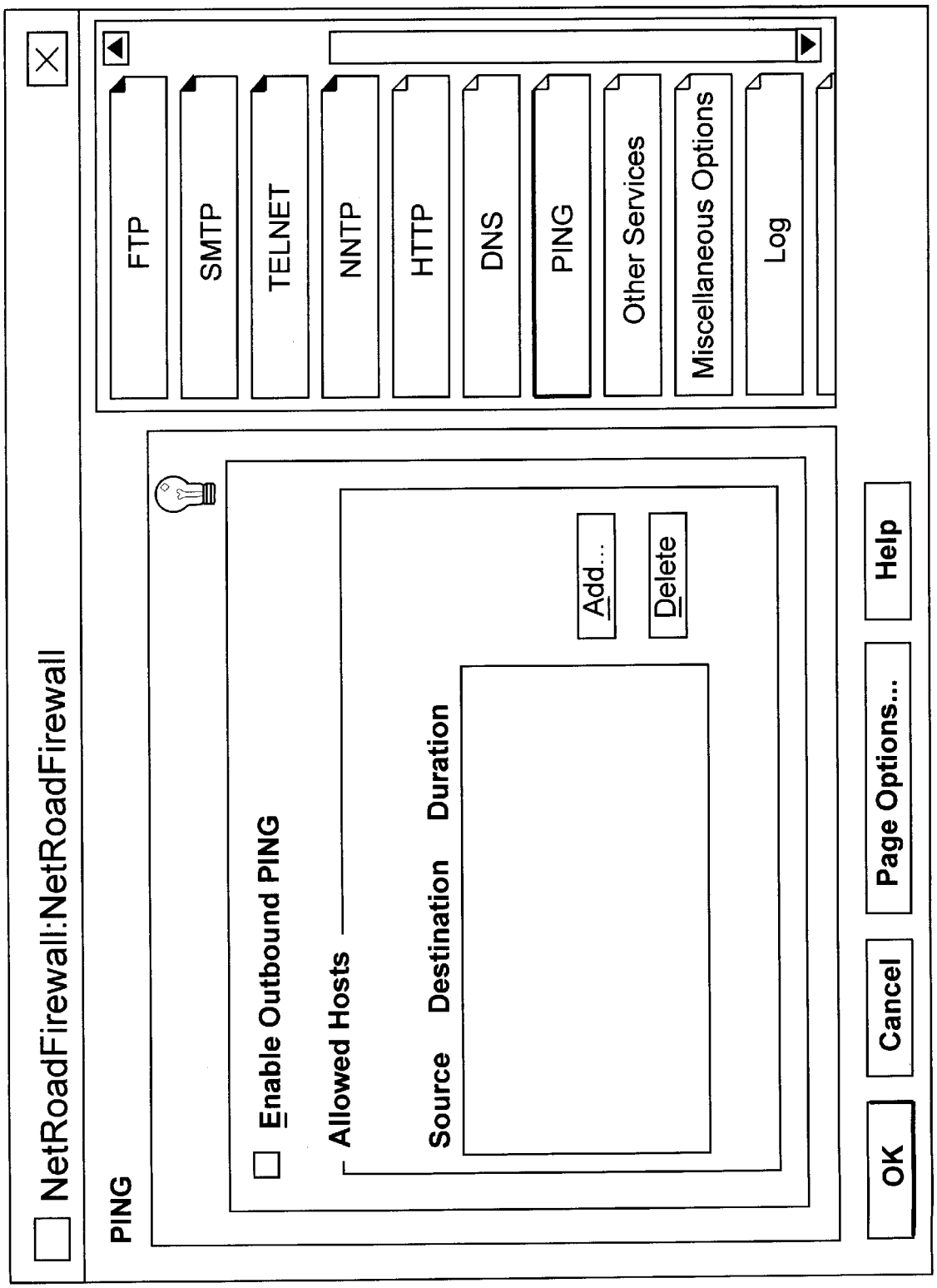

FIG. 17 illustrates that outbound PING data can be disabled at a particular firewall from the network administration client site.

Figure 18:
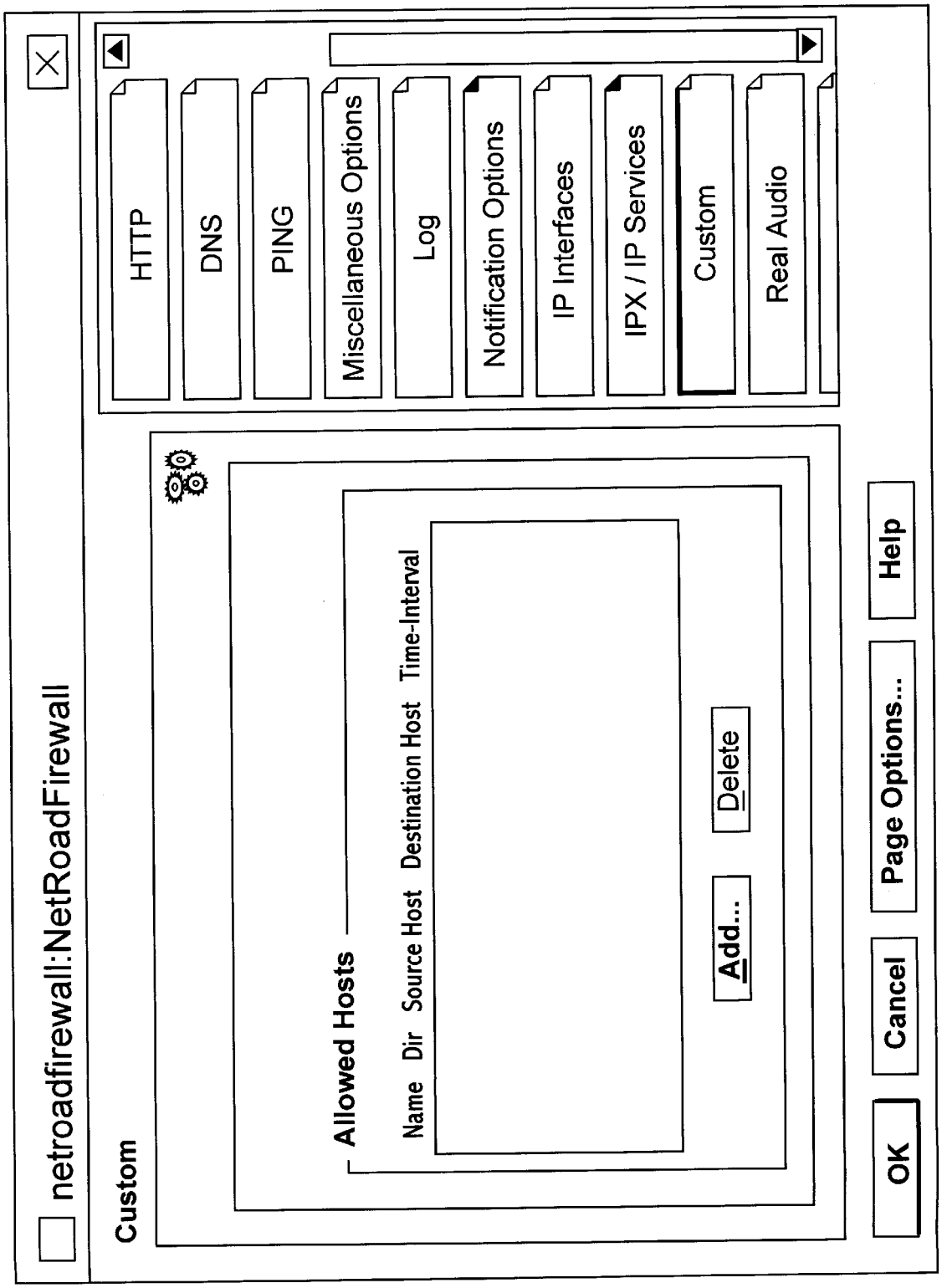

FIG. 18 illustrates that custom configuration of source and destination entities, as well as durations of these entities can be configured by a network administration client through directory services.

Figure 19:
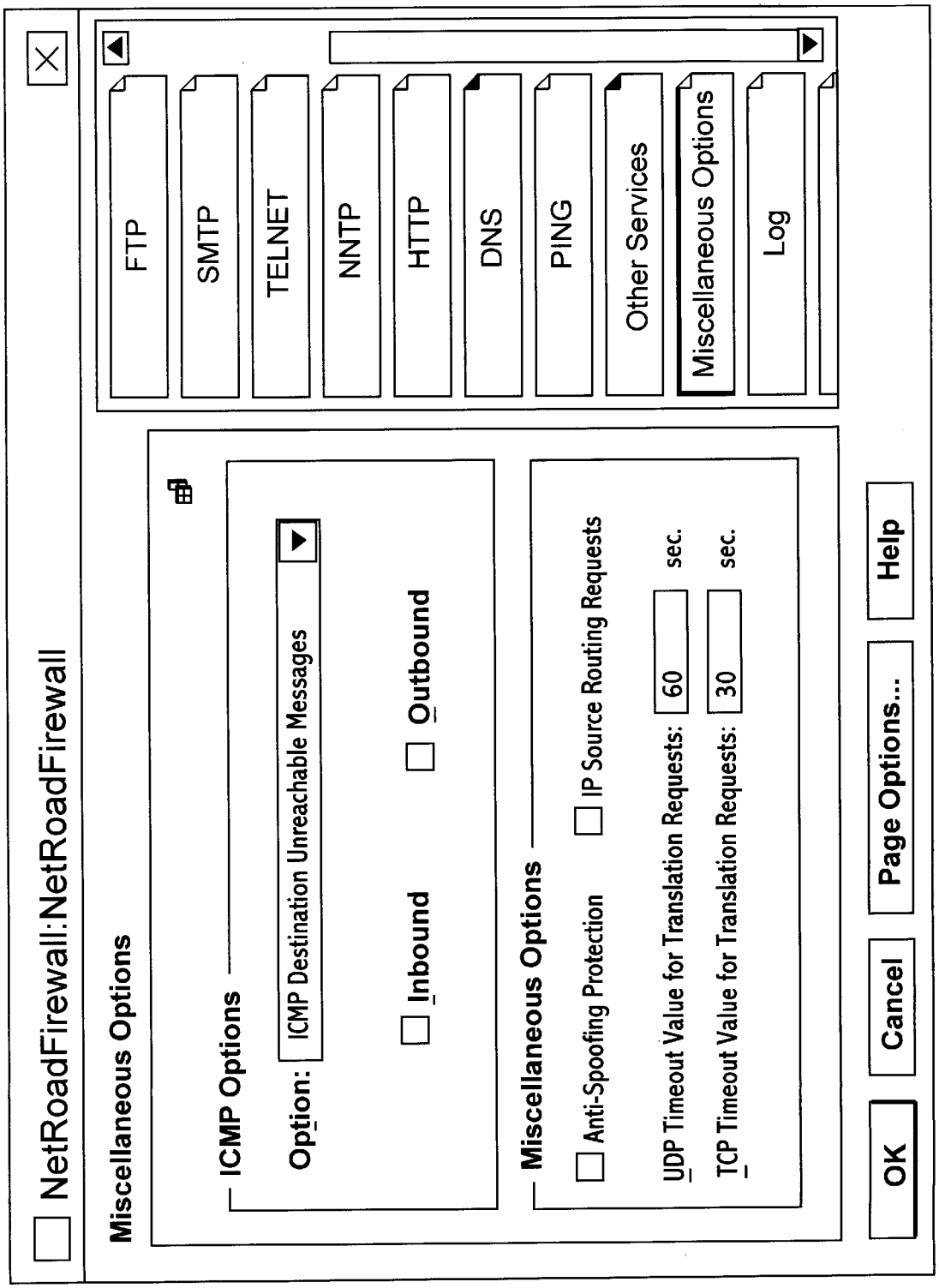

FIG. 19 illustrates that other protection such as anti-spoofing protection, time-out durations, etc. may also be configured by a network administration client through directory services.

Figure 20:
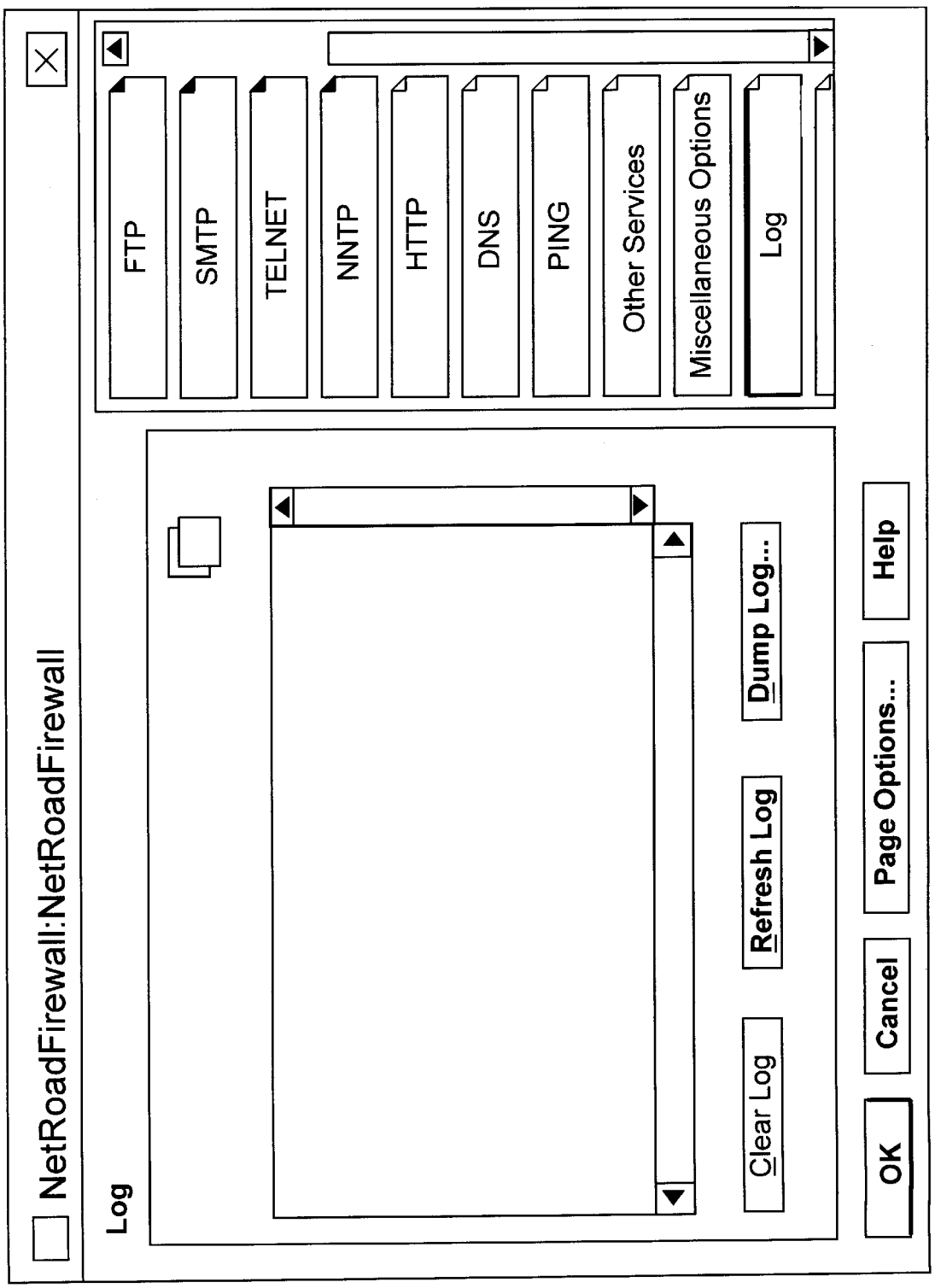

FIG. 20 illustrates that a firewall log may be viewed, stored, or deleted by a network administration client through directory services.

Figure 21:
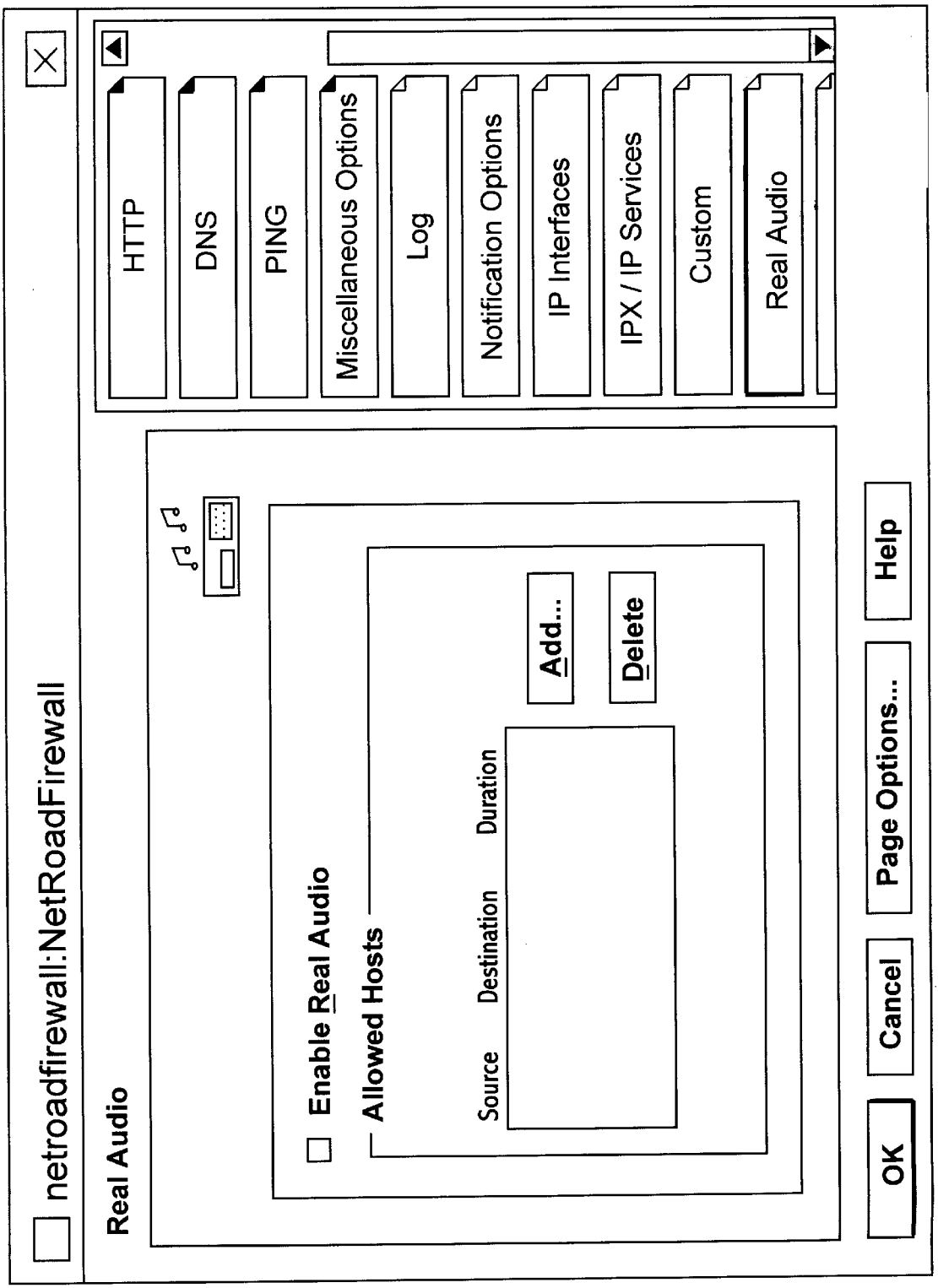

FIG. 21 illustrates that Real Audio access to (inbound) a particular firewall may also be disabled or strictly limited from the network administration client site.

Figure 22:
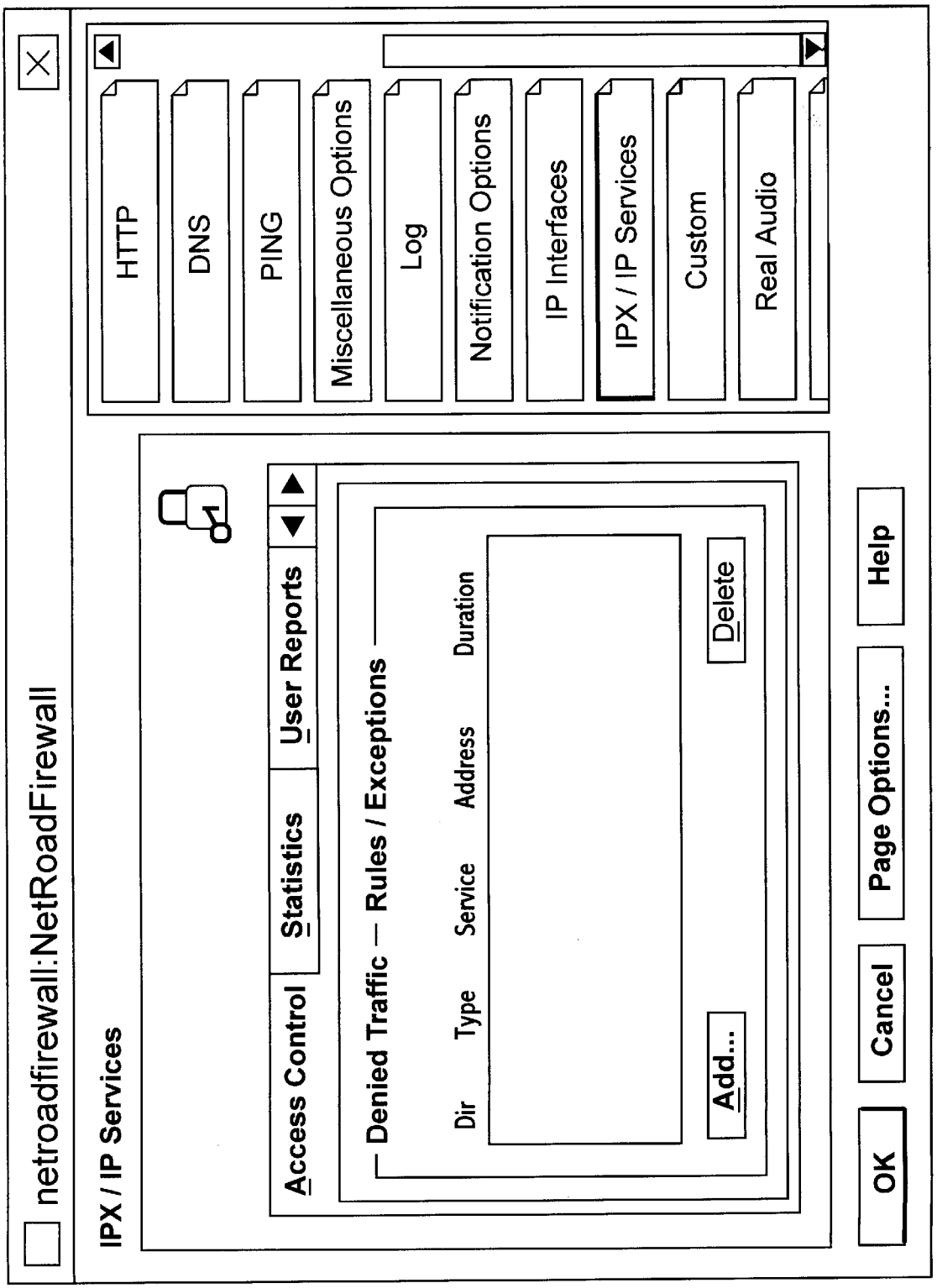

FIG. 22 illustrates that IP/IPX services of a particular firewall may also be limited from the network administration client site.

Figure 23:
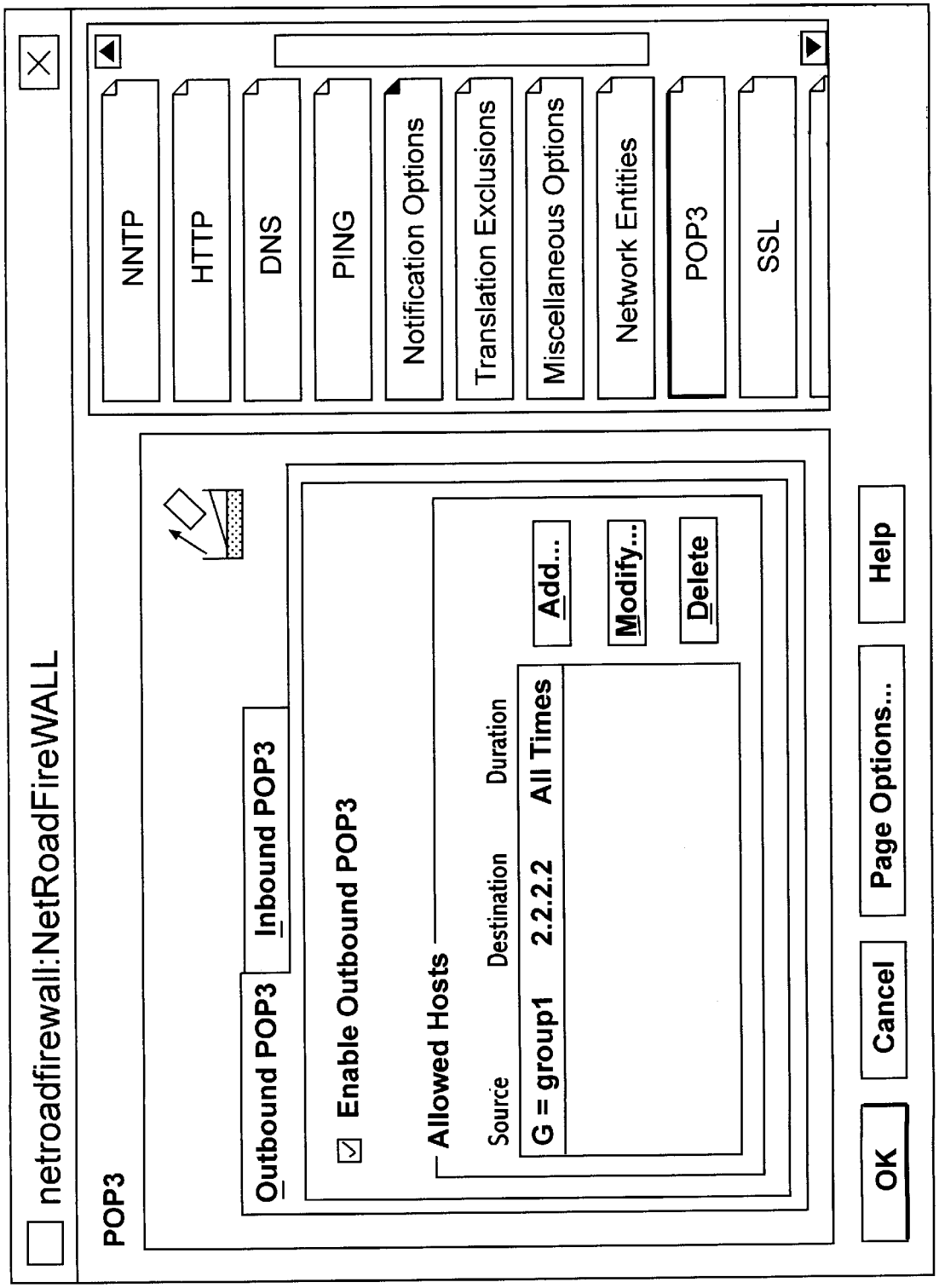

FIG. 23 illustrates that mail data, such as from POP3 servers and clients for a particular firewall may also be disabled or strictly limited from the network administration client site.

Figure 24:
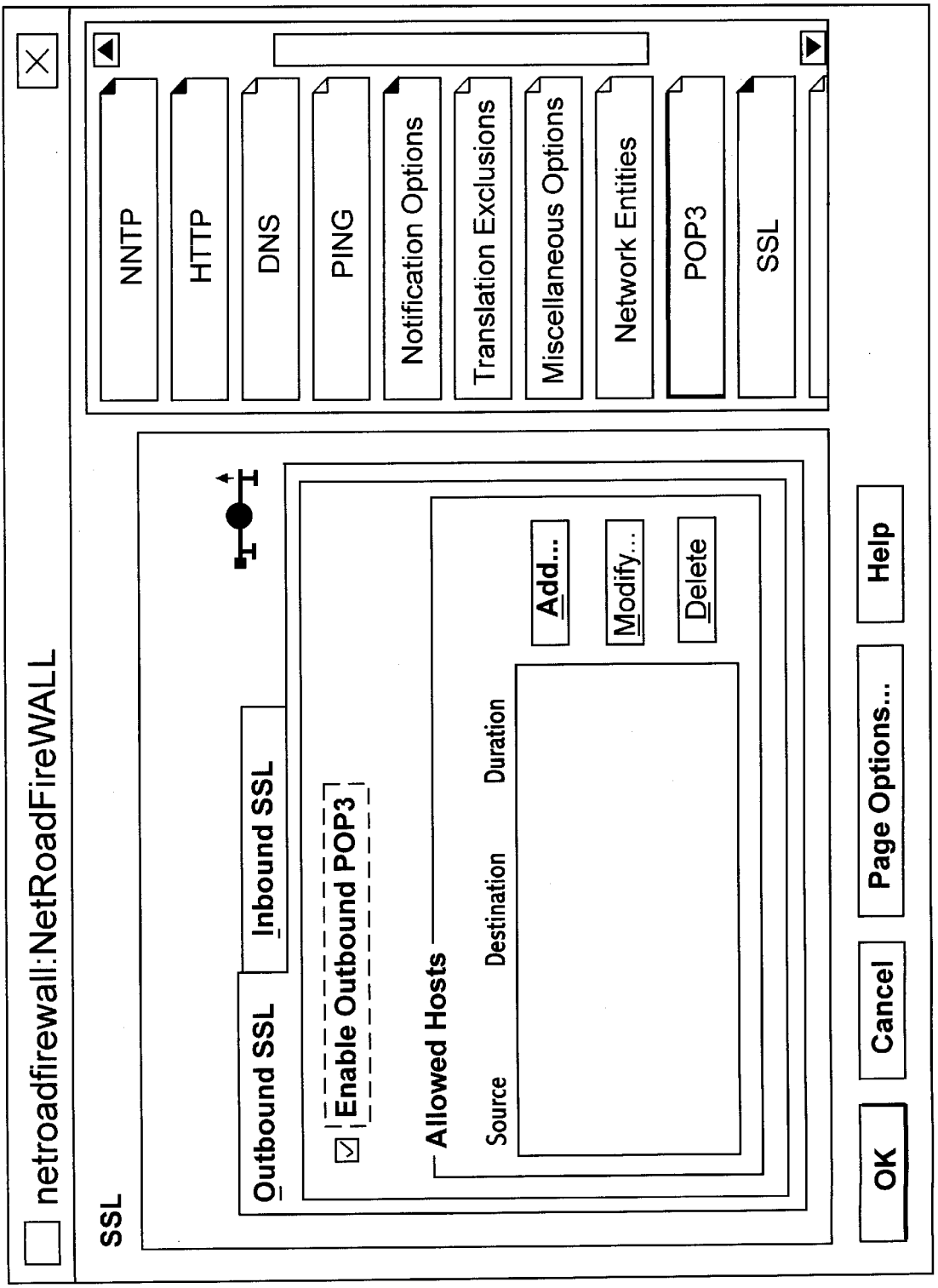

FIG. 24 illustrates that SSL access to and from (inbound and outbound) a particular firewall may also be disabled or strictly limited from the network administration client site.

Conclusion

In the foregoing specification, the invention has been described with reference to specific exemplary embodiments thereof. Many changes or modifications are readily envisioned. For example, it is envisioned that different directory services protocols or standards can be used such as LDAP, X500, AD (Active Directory), and the like in alternative embodiments of the present invention. Further, it is envisioned that firewall servers and other security devices may be implemented on different operating system platforms than WindowsNT, NetWare, IntranetWare, UNIX platforms, and the like such as MacOS or even proprietary hardware based firewall solutions. Still further, it is envisioned that in the future, other network protocols other than IP and IPX clients may be used in other embodiments.

The specification has been extensively described with regards to firewalls, however it should be understood that firewalls are merely a common term for a class or type of network access or security devices. Thus embodiments of the present invention can be used with other network security devices, Further, a firewall may have capabilities extending outside the reach of traditional firewalls, for example incorporating quality of service monitoring and metering capability. Still further, the present invention may be applied to security devices that include firewall capabilities although not specifically called firewalls. Such network access or security devices may also provide incoming network access control, outbound network access control, network quality of service control, and other imaginable network control.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for configuring a plurality of network security devices, comprising:

coupling each network security device of the plurality of network security devices to a network;

providing a network directory services server providing network directory services for the network coupled to each network security device, the network directory services including services for configuring the plurality of network security devices using the network directory services server;

providing a directory services database in the network directory services server for storing configuration information for the network;

managing the plurality of network security devices from the network directory services server;

implementing a security policy for the plurality of network security devices on the network directory services server;

using the network directory services to provide configuration information for the plurality of network security devices, in response to the security policy; and storing said configuration information for the plurality of network security devices in the directory services database.

2. The method of claim 1 wherein configuration information for a first network security device and a second network security device are substantially similar.

3. The method of claim 1 wherein configuration information for a first network security device and a second network security device are different.

4. The method of claim 2 wherein the first network security device is based upon a WindowsNT operating system and the second network security device is based upon a operating system selected from a class comprising Novell NetWare, Novell IntranetWare, and UNIX.

5. The method of claim 3 wherein a first network coupled to the first network security device includes a network server based upon a WindowsNT operating system and a second network coupled to the second network security device includes a second network server based upon an operating system selected from a class comprising of Novell NetWare, Novell IntranetWare, and UNIX.

6. The method of claim 1 wherein one of the plurality of network security devices is a firewall and the network directory services is selected from a class comprising Novell Directory Services, Light weight Directory Access Protocol, and Microsoft Active Directory Services.

7. The method of claim 1 wherein the network directory services is Novell Directory Services.

8. The method of claim 1 wherein the plurality of network security devices include a multi-level IP firewall and an IPX/IP gateway.

9. A method for configuring security features in a plurality of networks comprising:

providing a central network server providing directory services to the plurality of networks, the directory services including services for configuring security devices coupled to the plurality of networks;

providing a directory services database in the central network server for storing configuration information for the plurality of networks;

configuring security features for the plurality of networks via a remote client using the central network server;

using the directory services to provide each network of the plurality of networks with the security features; and storing the security features for the security devices in the directory services database.

10. The method of claim 9 wherein each of the plurality of networks are compliant to the directory services.

11. The method of claim 9 wherein security features of a first network from the plurality of networks and security features of a second network from the plurality of networks are different.

12. The method of claim 11 wherein the first network includes a server is based upon a Novell NetWare operating system, and the second network includes a server is based upon an operating system selected from the class comprising WindowsNT, Novell NetWare, Novell IntranetWare, and UNIX.

13. The method of claim 9 wherein the directory services is selected from a class comprising Novell Directory Services, Lightweight Directory Access Protocol, and Microsoft Active Directory Services.

14. The method of claim 9 wherein one of the plurality of networks includes a firewall server and wherein security features of one network comprises firewall configuration data.

15. A network of trusted network servers including a computer system for configuring security features for security devices coupled to the network of trusted network servers, the computer system including:

a processor; and a computer readable media including:

code that directs the processor to provide directory services to the network of trusted network servers, the directory services including services for configuring the security devices coupled to the network of trusted network servers;

code that directs the processor to store configuration information for the network of trusted network servers in a directory services database in the computer system;

code that directs the processor to manage the security devices coupled to the network of trusted network servers;

code that directs the processor to receive security feature configuration data for the security devices coupled to the network of trusted network servers from a remote client;

code that directs the processor to use the directory services to provide each of the security devices coupled to the network of trusted network servers with the security feature configuration data; and code that directs the processor to store the security feature configuration data in the directory services database.

16. The network of claim 15 wherein each of the plurality of network servers are compatible to the directory services.

17. The network of claim 15 wherein security feature configuration data of a first security device coupled to the network of trusted servers and security feature configuration data of a second security device coupled to the network of trusted servers are different.

18. The network of claim 17 wherein the first security device is based upon a Novell IntranetWare operating system, and the second security device is based upon an operating system selected from the class comprising WindowsNT, Novell NetWare, Novell IntranetWare, and UNIX.

19. The network of claim 17 wherein the directory services is selected from a class comprising Novell Directory Services, Lightweight Directory Access Protocol, and Microsoft Active Directory Services.

20. The network of claim 15 wherein security features of one of the security devices coupled to the network of trusted network servers comprises firewall features.

* * * * *

UNITED STATES PATENT AND TRADEMARK OFFICE
CERTIFICATE OF CORRECTION

PATENT NO. : 6,212,558 B1
DATED : April 3, 2001
INVENTOR(S) : Anad K. Antur et al.

It is certified that error appears in the above-identified patent and that said Letters Patent is hereby corrected as shown below:

<u>Title page,</u>
Insert the following, -- Name of Assignee:   Ukiah Software, Inc.
                                             Campbell, CA 95008 --

Signed and Sealed this

Twenty-third Day of April, 2002

Attest:

JAMES E. ROGAN
*Attesting Officer*   *Director of the United States Patent and Trademark Office*